(12) United States Patent
Hao et al.

(10) Patent No.: US 12,335,009 B2
(45) Date of Patent: Jun. 17, 2025

(54) FREQUENCY DOMAIN BASES REPORT WITH A REFERENCE INDEX ACROSS LAYERS

(71) Applicant: QUALCOMM Incorporated, San Diego, CA (US)

(72) Inventors: Chenxi Hao, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 17/594,109

(22) PCT Filed: May 1, 2020

(86) PCT No.: PCT/CN2020/088541
§ 371 (c)(1),
(2) Date: Oct. 1, 2021

(87) PCT Pub. No.: WO2020/224561
PCT Pub. Date: Nov. 21, 2020

(65) Prior Publication Data
US 2022/0182123 A1    Jun. 9, 2022

(30) Foreign Application Priority Data

May 13, 2019 (WO) ................ PCT/CN2019/085428

(51) Int. Cl.
*H04B 7/06* (2006.01)
*H04B 7/0456* (2017.01)
(52) U.S. Cl.
CPC ......... *H04B 7/0658* (2013.01); *H04B 7/0486* (2013.01); *H04B 7/0626* (2013.01)

(58) Field of Classification Search
None
See application file for complete search history.

(56) References Cited

U.S. PATENT DOCUMENTS

| | | |
|---|---|---|
| 10,848,229 B2 | 11/2020 | Tosato et al. |
| 11,063,649 B2 | 7/2021 | Zhang et al. |
| 11,838,082 B2 | 12/2023 | Sergeev et al. |
| 2011/0310870 A1 | 12/2011 | Van Nee et al. |
| 2019/0334587 A1* | 10/2019 | Rahman ............... H04B 7/0486 |

(Continued)

FOREIGN PATENT DOCUMENTS

CN 108933648 A 12/2018

OTHER PUBLICATIONS

Ericsson: "On CSI Enhancements for MU-MIMO", R1-1900757, 3GPP TSG RAN WG1 Meeting Ad-Hoc Meeting 1901,3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 11, 2019 (Jan. 11, 2019), XP051576296, 12 Pages, Sections 3 and 5.1.

(Continued)

*Primary Examiner* — Clemence S Han
(74) *Attorney, Agent, or Firm* — Patterson + Sheridan, L.L.P./Qualcomm

(57) ABSTRACT

Certain aspects of the present disclosure provide techniques for channel state information (CSI) reporting with frequency domain (FD) compression and, more particularly, to techniques for reporting frequency domain (FD) bases with a reference index across layers.

26 Claims, 10 Drawing Sheets

(56) References Cited

U.S. PATENT DOCUMENTS

| | | | | |
|---|---|---|---|---|
| 2020/0028555 | A1* | 1/2020 | Rahman | H04B 7/0639 |
| 2020/0162142 | A1* | 5/2020 | Rahman | H04B 7/0639 |
| 2020/0235790 | A1* | 7/2020 | Rahman | H04L 5/0051 |
| 2020/0274599 | A1* | 8/2020 | Rahman | H04B 7/0469 |
| 2020/0295812 | A1* | 9/2020 | Rahman | H04B 7/0626 |
| 2020/0295813 | A1* | 9/2020 | Rahman | H04B 7/0626 |
| 2020/0328862 | A1* | 10/2020 | Rahman | H04L 5/0044 |
| 2020/0343956 | A1* | 10/2020 | Rahman | H04B 7/0626 |
| 2021/0250076 | A1 | 8/2021 | Jin et al. | |
| 2021/0376887 | A1 | 12/2021 | Wu et al. | |
| 2022/0131586 | A1 | 4/2022 | Rupasinghe et al. | |
| 2022/0239357 | A1* | 7/2022 | Chung | H04B 17/345 |

OTHER PUBLICATIONS

Nokia, et al., "On UCI Reporting of SCI and FD Basis", R1-1905831, 3GPP TSG RAN WG1 Meeting #96bis, 3rd Generation Partnership Project (3GPP), Mobile Competence Centre, 650, Route Des Lucioles, F-06921 Sophia-Antipolis Cedex, France, vol. RAN WG1, No. Xian, China, Apr. 12, 2019-Apr. 16, 2019, Apr. 15, 2019 (Apr. 15, 2019), XP051707878, 2 Pages, Section 1.

Supplementary European Search Report—EP20802602—Search Authority—The Hague—Oct. 28, 2022.

Huawei., et al., "Discussion on CSI Enhancement", 3GPP TSG RAN WG1 Ad-Hoc Meeting 1901, R1-1900016, Jan. 12, 2019 (Jan. 12, 2019) the whole document, 15 pages.

International Search Report and Written Opinion—PCT/CN2020/088541—ISA/EPO—Jul. 30, 2020.

International Search Report and Written Opinion—PCT/CN2019/085428—ISA/EPO—Jan. 19, 2020.

Qualcomm Incorporated: "CSI Enhancement for MU-MIMO Support," 3GPP TSG RAN WGI Meeting #96bis, R1-1905025, Mar. 30, 2019, (Mar. 30, 2019), Paragraph 3.2, 15 pages.

Samsung: "Feature Lead Summary for MU-MIMO CSI Tuesday Offline Session", 3GPP TSG RAN WG1 96bis, Xi'an, China, Apr. 12-16, 2019, R1-1905724, 4 pages, Apr. 16, 2019 (Apr. 16, 2019), p. 3, Alt 5.5, Sections 1-2.

ZTE., "CSI Enhancement for MU-MIMO Support", R1-1904012, 3GPP TSG RAN WG1 Meeting #96bis, Mar. 30, 2019 (Mar. 30, 2019) the whole document, 15 pages.

ZTE: "CSI Enhancement for MU-MIMO Support," R1-1903343, 3GPP TSG RAN WG1 Meeting #96, Mar. 1, 2019 (Mar. 1, 2019), 16 pages, pp. 2-11.

* cited by examiner

610

| | | | | |
|---|---|---|---|---|
| RI = 4 | M | M | M2 < M | M2 < M |
| RI = 3 | M | M | M2 < M | |
| RI = 2 | M | M | | |
| RI = 1 | M | | | |
| | Layer 0 | Layer 1 | Layer 2 | Layer 3 |

620

| | | | | |
|---|---|---|---|---|
| RI = 4 | M2 < M | M2 < M | M2 < M | M2 < M |
| RI = 3 | M2 < M | M2 < M | M2 < M | |
| RI = 2 | M | M | | |
| RI = 1 | M | | | |
| | Layer 0 | Layer 1 | Layer 2 | Layer 3 |

630

| | | | | |
|---|---|---|---|---|
| RI = 4 | M40 < M | M41 < M | M42 < M | M43 < M |
| RI = 3 | M30 < M | M31 < M | M32 < M | |
| RI = 2 | M | M | | |
| RI = 1 | M | | | |
| | Layer 0 | Layer 1 | Layer 2 | Layer 3 |

FIG. 6

FREQUENCY DOMAIN BASES REPORT WITH A REFERENCE INDEX ACROSS LAYERS

CROSS-REFERENCE TO RELATED APPLICATION(S)

This application is a national stage application under 35 U.S.C. 371 of International Patent Cooperation Treaty Application No. PCT/CN2020/088541, filed May 1, 2020, which claims benefit of and priority to International Patent Cooperation Treaty Application No. PCT/CN2019/085428, filed May 3, 2019, which [is] are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for reporting frequency domain (FD) bases with a reference index across layers.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the disclosure relate to a method for wireless communication by a user equipment (UE). The method generally includes receiving, from a network entity, a channel state information (CSI) report configuration, configuring the UE for reporting at least a plurality of frequency domain (FD) bases information for a plurality of layers, identifying, from a set of candidate FD bases, one or more FD bases for each layer, wherein the identified one or more FD bases for each layer comprises a reference FD basis, and providing a report indicating the remaining FD bases other than the reference FD basis identified for each layer according to the CSI report configuration.

Certain aspects of the disclosure relate to a method for wireless communication by a user equipment (UE). The method generally includes signaling, to a user equipment (UE), a channel state information (CSI) report configuration, configuring the UE for reporting at least a plurality of frequency domain (FD) bases information for a plurality of layers, receiving a report from the UE identifying, from a set of candidate FD bases, one or more FD bases selected for each layer according to the CSI report configuration, wherein the identified one or more FD bases for each layer comprises a reference FD basis and the report indicates the remaining FD bases other than the reference FD basis identified for each layer, and using the FD bases identified in the report for subsequent communications with the UE.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates three tables showing example M values according to rank and layer, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
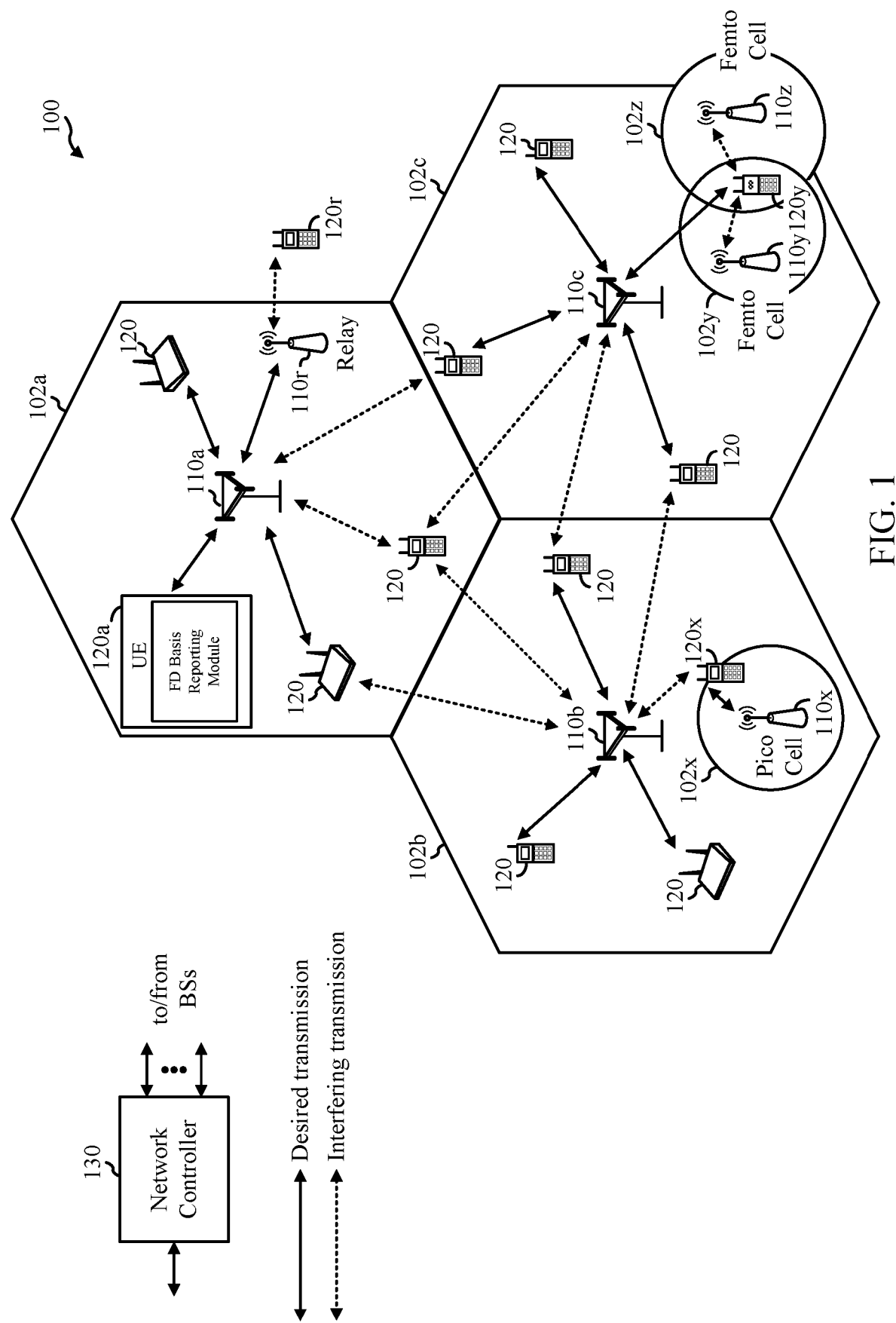
FIG. 1 is a block diagram conceptually illustrating an example telecommunications system, in accordance with certain aspects of the present disclosure.

Aspects of the present disclosure provide apparatus, methods, processing systems, and computer readable mediums for channel state information (CSI) reporting of frequency domain (FD) compression.

In certain systems, such as certain new radio systems (e.g., Release 16 5G NR systems), to save the overhead used for a linear combination codebook (also referred to as a Type II Codebook), a frequency compression based codebook may be used and reported via two stage uplink control information (UCI). In some aspects, the UE may report select FD bases for each layer independently, and the number of FD bases for each layer of each rank is determined based on a configuration from the network. In some aspects, a two-stage FD basis report is used to indicate the FD basis selection for each layer to the network. The first stage uses an intermediate set, while the second stage comprises individual FD basis report for each layer.

In some cases the size of the intermediate set is reported by the UE. That is, the UE freely selects the FD bases for each layer from a total number of $N_3$ FD bases; and the UE determines the intermediate set that covers the union of the FD bases selected for each layer. The UE needs to report the size of the intermediate set in UCI part 1 and report information related to the intermediate set in UCI part 2, and report individual FD basis for each layer in UCI part 2. In some other aspects, the size of the intermediate set is configured by the network or derived by the UE based on some other configured parameters following a rule fixed in the spec, or the size is explicitly specified in the a wireless communication specification. In this case, the UE needs to find an intermediate set common for all layers of a certain rank based on the size of the intermediate set. Then UE does not need to report the size, but may or may not need to report the information of the intermediate set in UCI part 2, and also report the individual FD bases for each layer in UCI part 2 from the intermediate set.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2"

(3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. A UE 120 in the wireless communication network 100 may receive a channel state information (CSI) report configuration from a base station. The CSI report configuration configures the UE 120 for CSI reporting.

For example, the CSI report configuration configures the UE 120 to determine precoding matrix information and an FD basis selection for each transmission layer based at least in part on an intermediate set size, wherein the intermediate set size is known between devices (e.g., base station and UE) and based on a wireless network configuration or rule. The UE 120 may report, in a UCI, the FD basis selection for the specific transmission layer.

In some cases the size of the intermediate set is reported by the UE. That is, the UE freely selects the FD bases for each layer from a total number of $N_3$ FD bases; and the UE determines the intermediate set that covers the union of the FD bases selected for each layer. The UE needs to report the size of the intermediate set in UCI part 1 and report information related to the intermediate set in UCI part 2, and report individual FD basis for each layer in UCI part 2. In some other aspects, the size of the intermediate set is configured by the network or derived by the UE based on some other configured parameters following a rule fixed in the spec, or the size is explicitly specified in the a wireless communication specification. In this case, the UE needs to find an intermediate set common for all layers of a certain rank based on the size of the intermediate set. Then UE does not need to report the size, but may or may not need to report the information of the intermediate set in UCI part 2, and also report the individual FD bases for each layer in UCI part 2 from the intermediate set.

In certain aspects, the BS may determine the intermediate set and size of the intermediate set (e.g., N3') using the same or similar methods as discussed herein for the UE. For example, the BS may utilize the same equations discussed for the UE. The information for making the determinations may be available to the BS as discussed with respect to the UE.

As illustrated in FIG. 1, the wireless communication network 100 may include a number of base stations (BSs) 110 and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20

Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.08 MHz (i.e., 6 resource blocks), and there may be 1, 2, 4, 8, or 16 sub-bands for system bandwidth of 1.25, 2.5, 5, 10 or 20 MHz, respectively.

Communication systems such as NR may utilize OFDM with a cyclic prefix (CP) on the uplink and downlink and include support for half-duplex operation using time division duplex (TDD). Beamforming may be supported and beam direction may be dynamically configured. MIMO transmissions with precoding may also be supported. MIMO configurations in the DL may support up to 8 transmit antennas with multi-layer DL transmissions up to 8 streams and up to 4 streams per UE. Multi-layer transmissions with up to 4 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
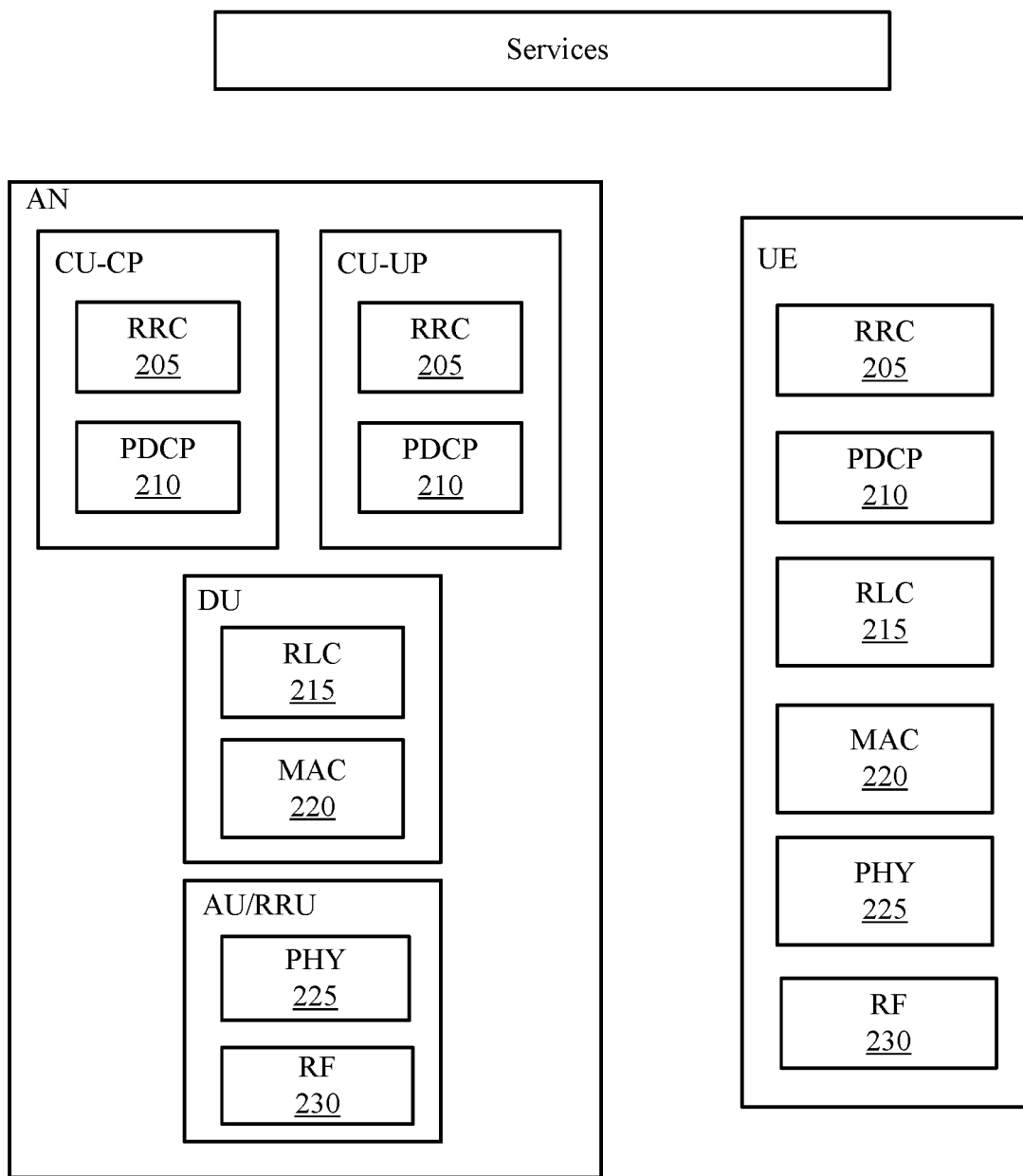
FIG. 2 is a block diagram showing examples for implementing a communication protocol stack in the example RAN architecture, in accordance with certain aspects of the present disclosure.

FIG. 2 illustrates a diagram showing examples for implementing a communications protocol stack in a RAN (e.g., such as the RAN 100), according to aspects of the present disclosure. The illustrated communications protocol stack 200 may be implemented by devices operating in a wireless communication system, such as a 5G NR system (e.g., the wireless communication network 100). In various examples, the layers of the protocol stack 200 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 2, the system may support various services over one or more protocols. One or more protocol layers of the protocol stack 200 may be implemented by the AN and/or the UE.

As shown in FIG. 2, the protocol stack 200 is split in the AN (e.g., BS 110 in FIG. 1). The RRC layer 205, PDCP layer 210, RLC layer 215, MAC layer 220, PHY layer 225, and RF layer 230 may be implemented by the AN. For example, the CU-CP may implement the RRC layer 205 and the PDCP layer 210. A DU may implement the RLC layer 215 and MAC layer 220. The AU/RRU may implement the PHY layer(s) 225 and the RF layer(s) 230. The PHY layers 225 may include a high PHY layer and a low PHY layer.

The UE may implement the entire protocol stack 200 (e.g., the RRC layer 205, the PDCP layer 210, the RLC layer 215, the MAC layer 220, the PHY layer(s) 225, and the RF layer(s) 230).

Figure 3:
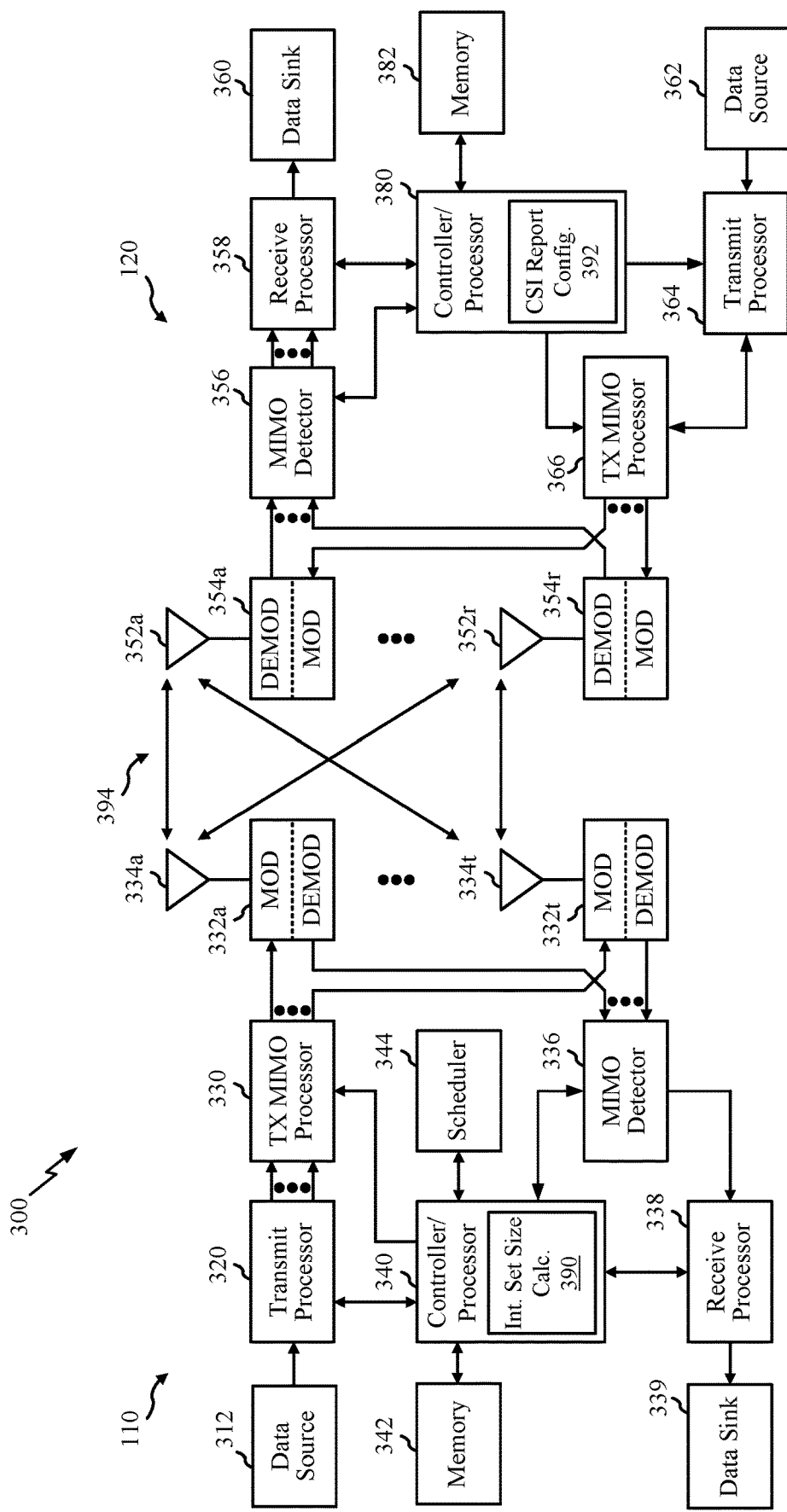
FIG. 3 is a block diagram conceptually illustrating a design of an example base station (BS) and user equipment (UE), in accordance with certain aspects of the present disclosure.

FIG. 3 illustrates example components of BS 110 and UE 120 (as depicted in FIG. 1), which may be used to implement aspects of the present disclosure. For example, antennas 352, processors 366, 358, 364, and/or controller/processor 380 of the UE 120 and/or antennas 334, processors 320, 330, 338, and/or controller/processor 340 of the BS 110 may be used to perform the various techniques and methods described herein. For example, as shown in FIG. 3, the processor 340 has an intermediate set size calculation module 390 that may be configured for determining precoding matrix information, including, for each layer, a common indication of a size of an intermediate set of frequency domain (FD) bases and an FD basis selection based on the intermediate set size. The intermediate set size calculation module 390 may also configure the UE 120 to report, in a first part of uplink control information (UCI), the indication of the size of the intermediate set of FD bases across all layers and, in a second part of UCI, the FD basis selection for the specific transmission layer, according to aspects described herein. For example, as shown in FIG. 3, the processor 380 has a CSI report configuration module 392 that may be configured for generating one or more CSI report parameters and transmitting the parameters to the UE, according to aspects described herein.

At the BS 110, a transmit processor 320 may receive data from a data source 312 and control information from a controller/processor 340. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 320 may process (e.g., encode and symbol map) the data and control information to obtain data symbols and control symbols, respectively. The processor 320 may also generate reference symbols, e.g., for the primary synchronization signal (PSS), secondary synchronization signal (SSS), and cell-specific reference signal (CRS). A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) in transceivers 354a through 354r, respectively. Each demodulator 354 may condition (e.g., filter, amplify, down-convert, and digitize) a respective received signal to obtain input samples. Each demodulator may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, de-interleave, and decode) the detected symbols, provide decoded data for the UE 120 to a data sink 360, and provide decoded control information to a controller/processor 380.

In a MIMO system, a transmitter (e.g., BS 120) includes multiple transmit antennas 354a through 354r, and a receiver (e.g., UE 110) includes multiple receive antennas 352a through 352r. Thus, there are a plurality of signal paths 394 from the transmit antennas 354a through 354r to the receive antennas 352a through 352r. Each of the transmitter and the receiver may be implemented, for example, within a UE 110, a BS 120, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system is limited by the number of transmit or receive antennas, whichever is lower. In addition, the channel conditions at the UE, as well as other considerations, such as the available resources at the base station, may also affect the transmission rank. For example, the rank (and therefore, the number of transmission layers) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

On the uplink, at UE 120, a transmit processor 364 may receive and process data (e.g., for the physical uplink shared channel (PUSCH)) from a data source 362 and control information (e.g., for the physical uplink control channel (PUCCH) from the controller/processor 380. The transmit processor 364 may also generate reference symbols for a reference signal (e.g., for the sounding reference signal (SRS)). The symbols from the transmit processor 364 may be precoded by a TX MIMO processor 366 if applicable, further processed by the demodulators in transceivers 354a through 354r (e.g., for SC-FDM, etc.), and transmitted to the base station 110. At the BS 110, the uplink signals from the UE 120 may be received by the antennas 334, processed by the modulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the BS 110 and the UE 120, respectively. The processor 340 and/or other processors and modules at the BS 110 may perform or direct the execution of processes for the techniques described herein. The memories 342 and 382 may store data and program codes for BS 110 and UE 120, respectively. A scheduler 344 may schedule UEs for data transmission on the downlink and/or uplink.

Figure 4:
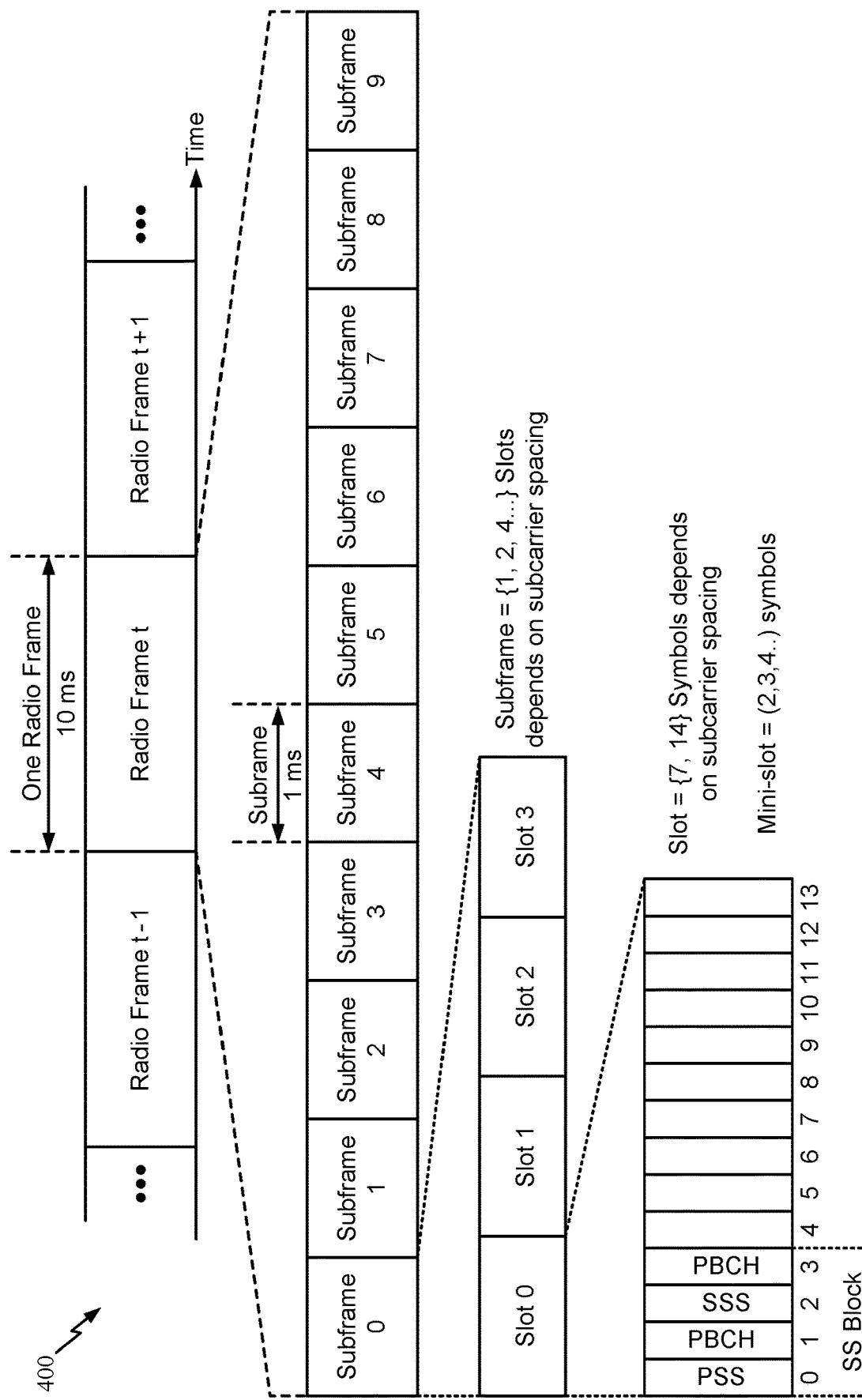
FIG. 4 illustrates an example of a frame format for a telecommunication system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example CSI Report Configuration

Channel state information (CSI) may refer to channel properties of a communication link. The CSI may represent the combined effects of, for example, scattering, fading, and power decay with distance between a transmitter and receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The time and frequency resources that can be used by the UE to report CSI are controlled by a base station (e.g., gNB). CSI may include Channel Quality Indicator (CQI), precoding matrix indicator (PMI), CSI-RS resource indicator (CRI), SS/PBCH Block Resource indicator (SSBRI), layer indicator (LI), rank indicator (RI) and/or L1-RSRP. However, as described below, additional or other information may be included in the report.

The base station may configure UEs for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Compressed CSI Feedback Coefficient Reporting

As discussed above, a user equipment (UE) may be configured for channel state information (CSI) reporting, for example, by receiving a CSI configuration message from the base station. In certain systems (e.g., Release 15 5G NR), the UE may be configured to report at least a Type II precoder across configured frequency domain (FD) units. For example, the precoder matrix $W_r$ for layer r includes the $W_1$ matrix, reporting a subset of selected beams using spatial compression (indicated by the spatial domain beam selection 822 contained in part two 820 of the UCI shown in FIG. 8) and the $W_{2,r}$ matrix, reporting (for cross-polarization) the linear combination coefficients for the selected beams (2L) across the configured FD units:

$$W_r = \sum_{i=0}^{2L-1} b_i \cdot c_i, \text{ where } c_i = [\underbrace{c_{i,0} \cdots c_{i,N_3-1}}_{N_3}],$$

where $b_i$ is the selected beam, $c_i$ is the set of linear combination coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is RRC configured.

The precoder is based on a linear combination of DFT beams. The Type II codebook may improve MU-MIMO performance. In some configurations considering there are two polarizations, the $W_{2,r}$ matrix has size $2L \times N_3$.

Figure 5:
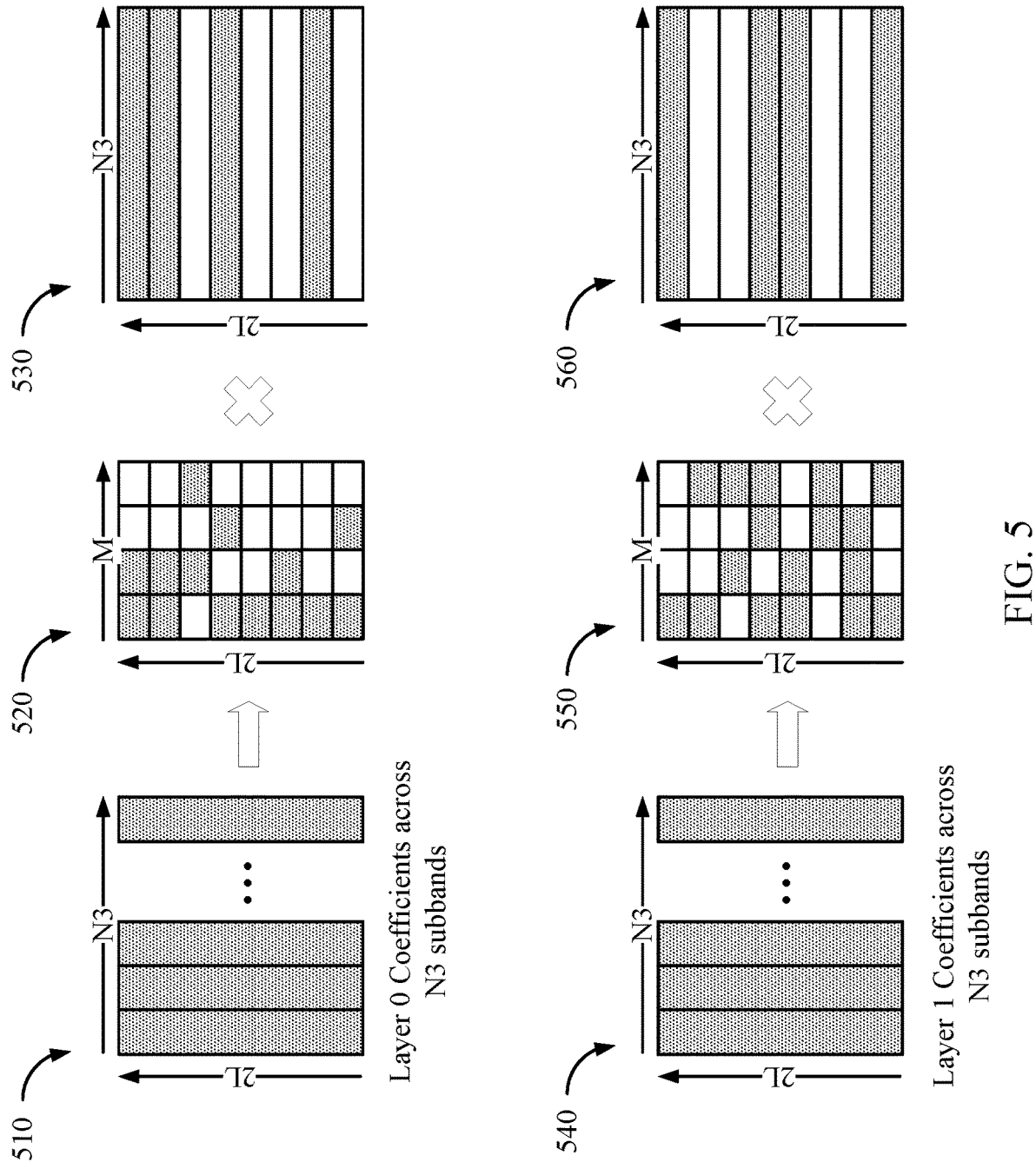
FIG. 5 illustrates a conceptual example of a first precoder matrix for transmission layer 0 and a second precoder matrix for transmission layer 1, in accordance with certain aspects of the present disclosure.

In certain systems (e.g., Rel-16 5G NR), the UE may be configured to report FD compressed precoder feedback to reduce overhead of the CSI report. As shown in FIG. 5, the precoder matrix ($W_{2,i}$) for layer i with i=0, 1 may use an FD compression $W_{f,i}^H$ matrix to compress the precoder matrix into $\tilde{W}_{2,i}$ matrix size to $2L \times M$ (where M is network configured and communicated in the CSI configuration message via RRC or DCI, and $M < N_3$) given as:

$$W_i = W_1 \tilde{W}_{2,i} W_{f,i}^H$$

Where the precoder matrix $W_1$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (amplitude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network configured via RRC), and one entry therein represents the coefficient of one tap for this spatial beam. The UE may be configured to report (e.g., CSI report) a subset $K_0 < 2LM$ of the linear combination coefficients of the $\tilde{W}_{2,0}$ matrix 520. For example, the UE may report $K_{NZ,i} < K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 corresponds to a row of $W_{f,0}^H$ matrix 530. In the example shown, both the $\tilde{W}_{2,0}$ matrix 520 at layer 0 and the $\tilde{W}_{2,0}$ matrix 550 at layer 1 are $2L \times M$.

The $W_{f,0}^H$ matrix 530 is composed of the basis vectors (each row is a basis vector) used to perform compression in frequency domain. In the example shown, both the $W_{f,0}^H$ matrix 530 at layer 0 and the $W_{f,1}^H$ matrix 560 at layer 1 include M=4 FD basis (illustrated as shaded rows) from $N_3$ candidate DFT basis. In some configurations, the UE may report a subset of selected basis of the $W_{f,i}^H$ matrix via CSI report. The M bases specifically selected at layer 0 and layer 1. That is, the M bases selected at layer 0 can be same/partially-overlapped/non-overlapped with the M bases selected at layer 1.

Frequency Domain Compression for High Rank Indication

FIG. 6 illustrates three alternative examples for determining the FD basis for a particular RI. Each example is illustrated as a table having a left column indicative of an RI (e.g., RI={1, 2, 3, 4}), and a bottom row indicative of a transmission layer (e.g., layer 0, layer 1, layer 2, layer 3). That is, the number of layers indicate a transmission rank, where RI=1 is limited to a single spatial layer, RI=2 corresponds to two spatial layers, RI=3 corresponds to three spatial layers, and RI=4 corresponds to four spatial layers. Accordingly, type II CSI may relate to UEs having up to four spatial layers.

In some configurations, FD compression for RI={3, 4} is comparable to RI=2. That is, the total number of non-zero coefficients to be reported for RI={3, 4} in $\tilde{W}_{2,i}$ matrix may be about equal to the total number of coefficients reported for RI=2. In some configurations, the UE can report at most $K_0$ total number of coefficients for each layer. For example, the UE can only report up to $K_0$ coefficients at RI=1, and up to $2K_0$ coefficients at RI=2. Thus, the maximum number of non-zero coefficients for a given RI={3, 4} can be described as:

$$\sum_{i=0}^{RI-1} K_{NZ,i} \leq 2K_0$$

In some configuration, for RI={3, 4}, UE may freely allocate the at most 2K0 coefficients across all layers; in some other configuration, for RI={3, 4}, UE may allocate no more than K0 coefficients for each layer of the 3 or 4 layers.

Similarly, the FD basis ($M_i$) for RI={3, 4} is comparable to RI=2. In one example, each layer (layer 0 and layer 1) of RI=2 uses M number of FD basis, making the FD basis across all four layers of RI=4 comparable to 2M. That is, $M_i$ for a given RI can be described as:

$$\sum_{i=0}^{RI-1} M_i \approx 2M$$

In the example shown in FIG. 5, the $W_{f,0}^H$ matrix 530 includes FD basis M=4 ($M_0$=4), and the $W_{f,1}^H$ matrix 560 includes FD basis M=4 ($M_1$=4), making a total of 8 FD bases for RI=2. Thus, for RI={3, 4} the total number of FD bases across all four layers should be comparable to $M_0+M_1$ or 2M (e.g., between 6 and 10 FD basis for RI={3, 4}).

As shown in FIG. 6, a first table 610 illustrates an example for adjusting the total number of FD bases for RI={3, 4} such that they are comparable to RI=2. In this example, the total number of FD bases for RI=2 is 2M. Thus, in order to ensure that the summation of $M_i$ for all layers of RI={3, 4} is comparable to RI=2, $M_2$ and $M_3$ are set to value M2 which is less than the total number of FD basis (M) for layers 0 and 1. Accordingly, if M2 is equal to one, then the total number of FD basis for RI=4 is (2M+2) and the total number of basis for RI=3 is (2M+1), where the total number of FD basis for RI=2 is 2M. In some cases, M2 may be set in the spec equal to M/2 or ⅔*M.

A second table 620 illustrates another example for making the total number of FD basis for RI={3, 4} comparable to RI=2. In this example, the FD basis for each of layers 0-3 is M2 for RI={3, 4}. In some cases, M2 may be set in the spec equal to M/2 or ⅔*M. A third table 630 illustrates another example for making the total number of FD basis for RI={3, 4} comparable to RI=2. In this example, each layer of RI={3, 4} may have a different value of M (e.g., RI=4 includes M40, M41, M42, and M43; RI=3 includes M30, M31, and M32). Each value of M is set such that the sum of all FD bases for R={3, 4} is comparable to RI=2. In some cases, if M=7, then it is specified in the spec that M30=5, M31=5, M32=4 and M40=4, M41=4, M42=3, M43=3.

Figure 7:
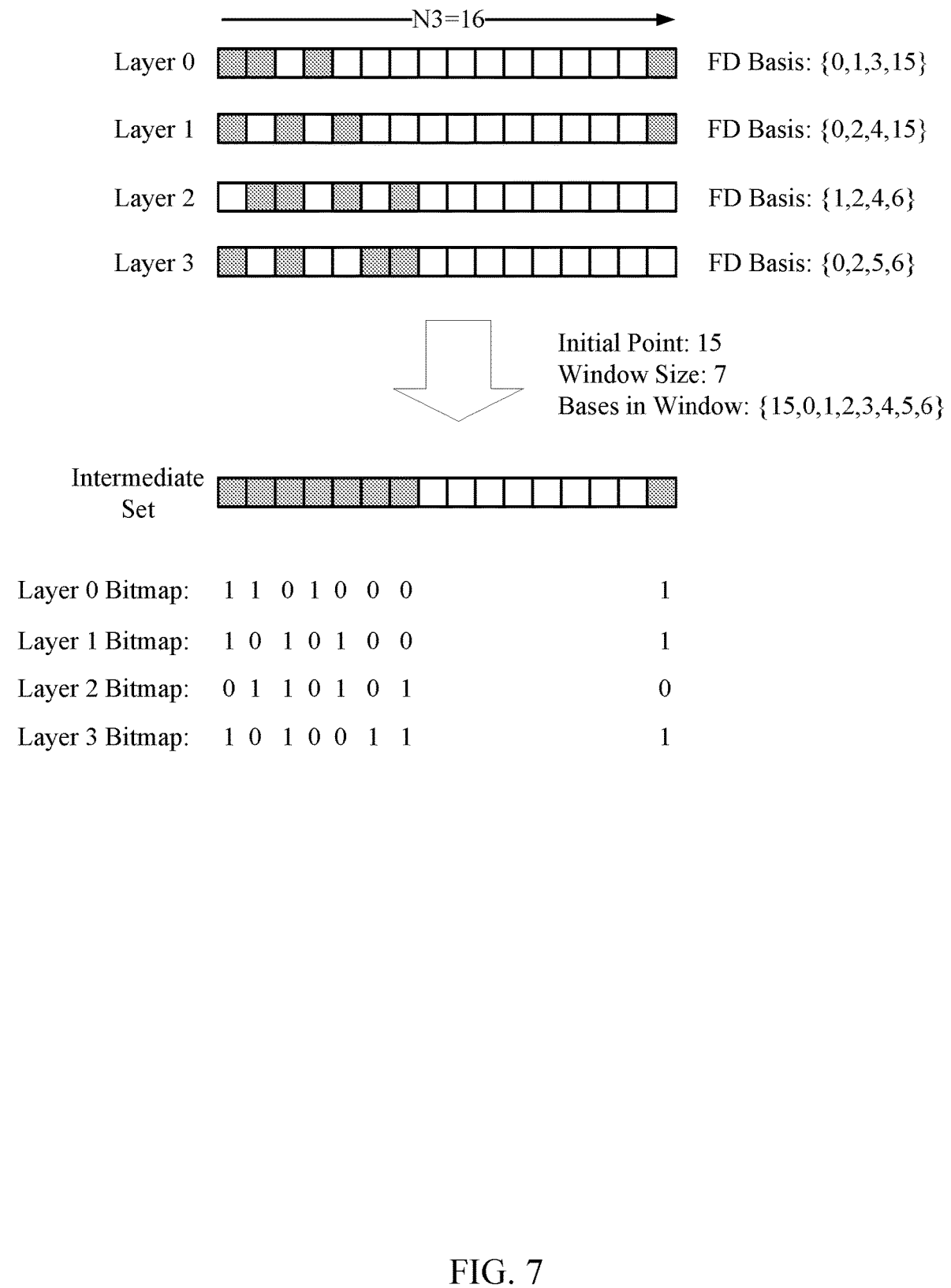
FIG. 7 illustrates an example intermediate set of FD bases from multiple layers, in accordance with certain aspects of the present disclosure.

FIG. 7 illustrates an example intermediate set containing a number of FD bases from multiple layers. As shown, the FD basis for each layer may be described as a bitmap and the intermediate set may be described as a window, wherein the window is characterized by a window size and an initial point. In this example, it is up to UE to determine the size of the intermediate set (i.e., size of the window). UE selects FD basis {0, 1, 3, 15} for layer 0, {0, 2, 4, 15} for layer 1, {1, 2, 4, 6} for layer 2 and {0, 2, 5, 6} for layer 3. Then the UE may determine the window size being 7, while the initial point is 15, indicating the intermediate set containing FD basis {15, 0, 1, 2, 3, 4, 5, 6}. In the second stage, the UE uses a 7-bit bitmap to indicate the FD basis for each layer from the intermediate set (i.e., the window).

Example FD Bases Reporting with a Reference Index Across Layers

In aspects of the techniques described herein, a UE may be configured for CSI reporting, for example, by receiving a CSI configuration message from a base station. In certain systems, the UE may be configured to report at least a Type II precoder across configured frequency domain (FD) units. For example, a precoder for a certain layer l on $N_3$ subbands may be expressed as a size-$P \times N_3$ matrix $W_l$:

$$W_l = \begin{bmatrix} \sum_{i=0}^{L-1} \sum_{m=0}^{M_l-1} v_{m_1^{(i)},m_1^{(i)}} p_{i,m}^{(1)} \cdot p_{i,m}^{(2)} \varphi_{i,m} \cdot f_{m_3^{(m)}}^H \\ \sum_{i=0}^{L-1} \sum_{m=0}^{M_l-1} v_{m_1^{(i)},m_1^{(i)}} p_{i+L,m}^{(1)} \cdot p_{i+L,m}^{(2)} \varphi_{i+L,m} \cdot f_{m_3^{(m)}}^H \end{bmatrix},$$

In this equation, L is the number of spatial domain (SD) basis (or bases) (e.g., spatial beams) configured by RRC signaling of the CSI report configuration, $v_{m_1^{(i)},m_2^{(i)}}$ with i=0, 1, . . . , L−1 is a $$\frac{P}{2} \times 1 \, SD$$

basis and it is applied to both polarizations. The SD bases ara DFT based and the SD basis with index $m_1^{(i)}$ and $m_2^{(i)}$ may be written as:

$$v_{m_1^{(i)},m_2^{(i)}} = \begin{bmatrix} u_{m_2^{(i)}} e^{\frac{j2\pi m_1^{(i)}}{O_1 N_1}} u_{m_2^{(i)}} & \ldots & e^{\frac{j2\pi m_1^{(i)}(N_1-1)}{O_1 N_1}} u_{m_2^{(i)}} \end{bmatrix}^T,$$

$$u_{m_2^{(i)}} = \begin{bmatrix} 1 & e^{\frac{j2\pi m_2^{(i)}}{O_2 N_2}} & \ldots & e^{\frac{j2\pi m_2^{(i)}(N_2-1)}{O_2 N_2}} \end{bmatrix}.$$

In this equation, $N_1$ and $N_2$ represents the first and the second dimension of the configured codebook, respectively. In some cases, these parameters may refer to the number of antenna elements on the vertical and horizontal dimension at the base station, respectively. The oversampling factor are denoted by $O_1$ and $O_2$.

Moreover, $f_{m_3^{(m)}}$ with m=0, 1, . . . $M_l$ is a $N_3 \times 1$ FD basis (i.e., $f_{m_3^{(m)}}^H$) is a $1 \times N_3$ row vector) which may also be known as the transferred domain basis. $M_l$ is the number of FD bases selected for layer l and it is derived based on RRC configuration. In some cases, for each layer of rank-1 and rank-2, there are M bases and value of $$M = \left\lceil p \times \frac{N_3}{R} \right\rceil$$

is determined by a ratio p configured by RRC and R is the number of precoding matric indicator (PMI) subbands within one CQI subband. For rank-3 and rank-4, $M_l$ may be dependent on M, e.g., $M_l$=M/2 or $M_l$=⅔ M for some layers, or $M_l=M$ for some other layers. The FD bases may be DFT bases, and the FD basis with index $m_3^{(m)} \in \{0, 1, \ldots N_3-1\}$ is expressed as:

$$f_{m_3{(m)}} = \left[1 \; e^{\frac{j2\pi m_3^{(m)}}{N_3}} \; \ldots \; e^{\frac{j2\pi m_3^{(m)}(N_3-1)}{N_3}}\right].$$

Linear combination coefficients may have three parts: $p_{i,m}^{(1)}, p_{i,m}^{(2)}, \varphi_{i,m}$. The parameter $p_{i,m}^{(1)}$ represents a amplitude reference for the first polarization, while $p_{i+L,m}^{(1)}$ represents the amplitude reference for the second polarization. They are common to all the coefficients associated with the corresponding polarization, i.e., $p_{i,m}^{(1)}=p_{i',m'}^{(1)}$, and $p_{i+L,m}^{(1)}=p_{i'+L,m'}^{(1)}$, $\forall i' \in \{i'\neq i | i'=0, 1, \ldots L-1\}$, $\forall m' \in \{m'\neq m | m'=0, 1, \ldots M_l\}$. Besides, the parameter $p_{i,m}^{(2)}$ represents a (differential) amplitude the coefficient associated with SD basis with index $m_1^{(i)}$ and $m_2^{(2)}$, and associated with the FD basis with index $m_3^{(m)}$ in the first polarization, while $p_{i+L,m}^{(2)}$ represents a (differential) amplitude the coefficient associated with SD basis with index $m_1^{(i)}$ and $m_2^{(2)}$, and associated with the FD basis with index $m_3^{(m)}$ in the second polarization. Similarly, the parameter $\varphi_{i,m}$ represents a (differential) amplitude the coefficient associated with SD basis with index $m_1^{(i)}$ and $m_2^{(2)}$, and associated with the FD basis with index $m_3^{(m)}$ in the first polarization, while $\varphi_{i+L,m}$ represents a (differential) amplitude the coefficient associated with SD basis with index $m_1^{(i)}$ and $m_2^{(2)}$, and associated with the FD basis with index $m_3^{(m)}$ in the second polarization. For each layer of rank-1 and rank-2, among the 2LM coefficients, UE may report at most $K_0$ coefficients, while the unreported coefficients are set to zeros. The value of $K_0=\lceil \beta \times 2LM \rceil$ may be derived based on RRC configuration of P. For rank-3 and rank-4, UE may report at most $2K_0$ coefficients across all layers so that the max payload for rank-3/4 may be comparable to the max payload of rank-2.

In some configurations, the UE may select FD bases specifically for each particular layer. In some cases, a combinatorial number may be used to indicate the selection of $M_l$ from $N_3$ bases for layer 1 using $$\left\lceil \log_2 \binom{N_3}{M_l} \right\rceil - \text{bit,}$$

wherein the encoding/decoding of the $$\left\lceil \log_2 \binom{N_3}{M_l} \right\rceil - \text{bit}$$

comprises a mapping/demapping of combination of $\{m_3^{(0)}, m_3^{(1)}, \ldots, m_3^{(M_l-1)}\}$-th FD basis to a codepoint of $$\left\lceil \log_2 \binom{N_3}{M_l} \right\rceil.$$

In some other cases, a bitmap with size $N_3$-bit may be used to indicate the selection of $M_l$ from $N_3$ bases for layer 1 (i.e., indicating the combination of)$\{m_3^{(0)}, m_3^{(1)}, \ldots, m_3^{(M_l-1)}\}$, by setting the $m_3^{(0)}$-th, $m_3^{(1)}$-th, $\ldots$, $m_3^{(M_l-1)}$-th bit to 1, while others to zeros).

In some configurations, a fixed FD basis may be specified (e.g., fixed in a standard specification or configured) so that a UE may only need to report $M_l-1$ from $N_3-1$ bases for layer 1. The indication of $M_l-1$ from $N_3-1$ bases for layer 1 may comprise explicitly indicating the index of the $M_l-1$ FD bases, or may comprise indicating an offset relative to the fixed FD basis while the index of the $M_l-1$ FD bases are based on their corresponding offset. In some cases, a combinatorial number may be used to indicate the selection of $M_l-1$ from $N_3-1$ bases for layer 1 using $$\left\lceil \log_2 \binom{N_3-1}{M_l-1} \right\rceil - \text{bit.}$$

In some case, assuming last FD basis is fixed as the last FD basis in the entire FD bases set, i.e., $m_3^{(M_l-1)}=N_3-1$, the encoding/decoding of the $$\left\lceil \log_2 \binom{N_3-1}{M_l-1} \right\rceil - \text{bit}$$

comprises a mapping/demapping of combination of) $\{m_3^{(0)}, m_3^{(1)}, \ldots, m_3^{(M_l-2)}\}$-th FD basis to a codepoint of $$\left\lceil \log_2 \binom{N_3-1}{M_l-1} \right\rceil.$$

In some other cases, assuming last FD basis is fixed as the last FD basis in the entire FD bases set, i.e., $M_3^{(M_l-1)}=N_3-1$, the encoding/decoding of the $$\left\lceil \log_2 \binom{N_3-1}{M_l-1} \right\rceil - \text{bit}$$

comprises a mapping/demapping of combination of offsets $\{o_3^{(0)}-1, o_3^{(1)}-1, \ldots, o_3^{(M_l-2)}-1\}$ ($o_3^{(m)} \in \{1, 2, \ldots, N_3-1\}$) to a codepoint of $$\left\lceil \log_2 \binom{N_3-1}{M_l-1} \right\rceil,$$

wherein the FD basis index $m_3^{(m)}=N_3-1-o_3^{(m)}$, $m=0, 1, \ldots M_l-2$. In some cases, assuming the fixed FD basis is defined as the first FD basis in the entire FD bases set, i.e., $m_3^{(0)}=0$, a codepoint of $$\left\lceil \log_2 \binom{N_3-1}{M_l-1} \right\rceil$$

indicates a combination of the $\{m_3^{(1)}, m_3^{(2)}, \ldots, m_3^{(M_l-1)}\}$-th FD basis, wherein the encoding/decoding of the $$\left\lceil \log_2 \binom{N_3-1}{M_l-1} \right\rceil$$

-bit comprises a mapping/demapping of combination of the offset $\{o_3^{(1)}-1, o_3^{(2)}-1, \ldots, o_3^{(M_l-1)}-1\}$ relative to the fixed FD basis, wherein the FD basis index $m_3^{(m)}=o_3^{(m)}$, m=2, 1, ... $M_l$-1. In some other cases, a bitmap with size ($N_3$-1)-bit may be used to indicate the selection of $M_l$ from $N_3$ bases for layer 1. Assuming the fixed (reference) FD basis is the last FD basis in the entire FD bases set, i.e., $m_3^{(M_l-1)}=N_3-1$, it may indicate the combination of $\{m_3^{(0)}, m_3^{(1)}, \ldots, m_3^{(M_l-2)}\}$-th FD basis, by setting the $m_3^{(0)}$-th, $m_3^{(1)}$-th, ..., $m_3^{(M_l-2)}$-th bit to 1, respectively, while others to zeros. In some other cases, it may indicates the combination of offsets $\{o_3^{(0)}-1, o_3^{(1)}-1, \ldots, o_3^{(M_l-2)}-1\}$-th FD basis, by setting the $(o_3^{(0)}-1)$-th, $(o_3^{(1)}-1)$-th, ..., $(o_3^{(M_l-2)}-1)$-th bit to 1, respectively, while others to zeros. In this case, the FD basis index $m_3^{(m)}=N_3-1-o_3^{(m)}$, m=0, 1, ... $M_l$-2. In some other cases, assuming the first FD basis is fixed as the first FD basis in the entire FD bases set, i.e., $m_3^{(0)}=0$. It may indicates the combination of $\{m_3^{(1)}, m_3^{(2)}, \ldots, m_3^{(M_l-1)}\}$-th FD basis by indicating the offset to the first FD basis (wherein a zero offset means the next adjacent FD basis), by setting the $(o_3^{(1)}-1)$-th, $(o_3^{(2)}-1)$-th, ..., $(o_3^{(M_l-1)}-1)$-th bit to 1, while others to zeros. In this case, the FD basis index $m_3^{(m)}=o_3^{(m)}$, m=1, 2, ... $M_l$-1.

In some cases, to achieve a lower feedback overhead, a two-stage FD bases report mechanism may be used. The motivation for such a mechanism may be as follows. The selected bases may be located relatively close, and the span of the M bases (e.g., from the first selected basis to the last selected basis) may occupy only a small portion of the entire $N_3$ candidate basis. Moreover, the span of the M basis selected for different layers may partially overlapped. Hence, a two-step report of the FD basis is useful. In the two-stage FD basis report, a first stage uses an intermediate set to capture the commonality among the FD basis selection across layers, while in the second stage, the UE reports FD bases for each layer based on the intermediate set. Thus, the bitwidth in layer-specific FD bases report in the second stage can be reduced.

In some cases, the intermediate set is a selection of $N_3'$ bases from $N_3$ bases. In some cases, the intermediate set size M is reported by UE in UCI part 1. In this case, the UE may freely select the FD bases for each layer from the entire set of $N_3$ bases. Then, based on the selection results, the UE may determine the intermediate set size M so as to cover the union of the FD bases selection for all layers. In some other cases, the intermediate set size $N_3'$ may be configured by the network or fixed in the spec or derived via other parameters following a rule fixed in the spec. In this case, UE may first select an intermediate set common for all layers, then report layer-specific FD bases within the intermediate set. Denoting the local index within the intermediate set by $n_3^{(m)}$, $n_3^{(m)} \in \{0, 1, \ldots, N_3'\}$, then the actual FD basis in the entire set can be obtained by $m_3^{(m)}=f(n_3^{(m)})$, the exact mapping function depends on how the FD bases in the intermediate set are selected from the entire set of $N_3$ bases. For no matter $N_3'$ being fixed or reported or configured, when UE reports $N_3'$ FD bases out of the $N_3$ bases, similar approach as in the one-stage scheme can be applied.

In some cases, the intermediate set is a window. The window may be characterized by a starting index $M^{initial}$ and a window size $N_3'$. That is, the FD bases included in the window-based intermediate set are those with indices mod $(M^{initial}+n, N_3)$ where $n=0, 1, \ldots N_3'$. In the second stage of the bases report, the UE may report $M_l$ bases from $N_3'$ bases in the intermediate set rather than from the entire set of $N_3$ bases. Then, with the window-based intermediate set, $m_3^{(m)}$ $\in \{0, 1, \ldots N_3-1\}$ denoting the index of the m-th selected FD basis in the entire set of $N_3$ bases, may be written as $$m_3^{(m)}=\mod(M^{initial}+n_3^{(m)}, N_3).$$

In this equation, $n_3^{(m)} \in \{0, 1, \ldots, N_3'-1\}$ represents the $n_3^{(m)}$-th FD basis in the window-based intermediate set, while $m \in \{0, 1, \ldots M_l\}$ refers to the m-th FD basis indicated by the indicator transmitted in the second stage bases report for layer 1.

In some cases, the UE may report the window size $N_3'$ via a $\lceil \log_2 N_3 \rceil$-bit indicator in UCI part 1, and may report the starting index $M^{initial}$ via a $\lceil \log_2 N_3 \rceil$-bit indicator in UCI part 2. In this case, the UE may freely select the FD bases for each layer from the entire set of $N_3$ bases. Then, based on the selection results, the UE may determine the window size and starting index so as to cover the union of the FD bases selection for all layers.

In some cases, the UE may receive a configuration of the window size $N_3'$, or the UE may determine $N_3'$ based on some other parameters following a fixed rule, or $N_3'$ may be fixed and UE may be able to identify the $N_3'$ fixed value. The UE may also report the starting index $M^{initial}$ via a $\lceil \log_2 N_3 \rceil$-bit indicator in UCI part 2. In this case, UE may firstly find the best window with the best starting index given the configured or derived window size (e.g., the window and starting index that corresponds to bases used to identify a selected or preferred beam). The UE may secondly perform FD bases selection focusing on the window-based intermediate set.

In some cases, the UE may report the window size M via a $\lceil \log_2 N_3 \rceil$-bit indicator in UCI part 1. The UE may receive a configuration indicating the starting index $M^{initial}$ or $M^{initial}$ may be fixed and the UE may be able to identify the fixed $M^{initial}$ value, e.g., $M^{initial}=0$. Then, the index of the m-th selected FD basis is $m_3^{(m)}=n_3^{(m)}$, where $n_3^{(m)} \in \{0, 1, \ldots N_3'-1\}$. In this case, the UE may freely select the FD bases for each layer from the entire set of $N_3$ bases. Then, based on the selection results, the UE may determine the window size and starting index by shifting the selection results of the FD bases for each layer, so as to cover the union of the FD bases selection for all layers.

In some cases, a UE may receive a configuration of the window size $N_3'$, or the UE may determine $N_3'$ based on some other parameters following a fixed rule, or $N_3'$ may be fixed and the UE may be able to identify the fixed $N_3'$ value. The UE may receive a configuration indicating the starting index $M^{initial}$ or $M^{initial}$ may be fixed and the UE may be able to identify the fixed $M^{initial}$ value, e.g., $M^{initial}=0$. Then, the index of the m-th selected FD basis is $m_3^{(m)}=n_3^{(m)}$, where $n_3^{(m)} \in \{0, 1, \ldots, N_3'-1\}$. In this case, the UE may firstly find the best window with the best starting index given the configured or derived window size (e.g., the window and starting index that corresponds to bases used to identify a selected or preferred beam). The UE may secondly perform FD bases selection focusing on the window-based intermediate set.

For the second stage bases report, in some configurations, a fixed FD basis of the intermediate set may be specified (e.g., specified in a standard specification or RRC configured) so that a UE may only need to report $M_l$-1 from $N_3'$-1 bases for layer 1. The indication of $M_l$-1 from $N_3'$-1 bases for layer 1 may comprise explicitly indicating the index of the $M_l$-1 FD bases in the intermediate set, or may comprise indicating an offset relative to the fixed FD basis while the index of the $M_l$-1 FD bases in the intermediate set are based on their corresponding offset. In some cases, a combinatorial number may be used to indicate the selection of $M_l-1$ from $N_3'-1$ bases for layer l using $$\left\lceil \log_2 \binom{N_3'-1}{M_l-1} \right\rceil - \text{bit}.$$

In some case, assuming last FD basis is fixed as the last FD basis in the intermediate FD bases set, i.e., $n_3^{(M_l-1)}=N_3'-1$, the encoding/decoding of the $$\left\lceil \log_2 \binom{N_3'-1}{M_l-1} \right\rceil - \text{bit}$$

comprises a mapping/demapping of combination of $\{n_3^{(0)}, n_3^{(1)}, \ldots, n_3^{(M_l-2)}\}$-th FD basis in the intermediate set to a codepoint of $$\left\lceil \log_2 \binom{N_3'-1}{M_l-1} \right\rceil.$$

In some other cases, assuming last FD basis is fixed as the last FD basis in the intermediate FD bases set, i.e., $n_3^{(M_l-1)}=N_3'-1$, the encoding/decoding of the $$\left\lceil \log_2 \binom{N_3'-1}{M_l-1} \right\rceil - \text{bit}$$

comprises a mapping/demapping of combination of offsets $\{o_3^{(0)}-1, o_3^{(1)}-1, \ldots, o_3^{(M_l-2)}-1\}$ ($o_3^{(m)} \in \{1, 2, \ldots N_3'-1\}$) to a codepoint of $$\left\lceil \log_2 \binom{N_3'-1}{M_l-1} \right\rceil,$$

wherein the FD basis index in the intermediate set is $n_3^{(m)}=N_3'-1-o_3^{(m)}$, $m=0, 1, \ldots M_l-2$. In some cases, assuming first FD basis is the fixed FD basis and it is defined as the first FD basis in the intermediate FD bases set, i.e., $m_3^{(0)}=0$, a codepoint of $$\left\lceil \log_2 \binom{N_3'-1}{M_l-1} \right\rceil$$

indicates a combination of the $\{n_3^{(1)}, n_3^{(2)}, \ldots, n_3^{(M_l-1)}\}$-th FD basis, wherein the encoding/decoding of the $$\left\lceil \log_2 \binom{N_3'-1}{M_l-1} \right\rceil - \text{bit}$$

comprises a mapping/demapping of combination of the offset $\{o_3^{(1)}-1, o_3^{(2)}-1, \ldots, o_3^{(M_l-1)}-1\}$ relative to the fixed FD basis, wherein the FD basis index in the intermediate FD basis set is $n_3^{(m)}=o_3^{(m)}$, $m=2, 1, \ldots M_l-1$. In some cases, assuming FD basis in the middle of the intermediate set is the fixed FD basis, i.e., $$n_3^{(\lfloor \frac{M_l}{2} \rfloor)} = \left\lfloor \frac{N_3'}{2} \right\rfloor,$$

a codepoint of $$\left\lceil \log_2 \binom{N_3'-1}{M_l-1} \right\rceil$$

indicates a combination of the $$\left\{ n_3^{(0)}, \ldots, n_3^{(\lfloor \frac{M_l}{2} \rfloor-1)}, n_3^{(\lfloor \frac{M_l}{2} \rfloor-1)}-1 \ldots, n_3^{(M_l-1)}-1 \right\}$$

-th FD basis in the intermediate FD basis set, wherein the encoding/decoding of the $$\left\lceil \log_2 \binom{N_3'-1}{M_l-1} \right\rceil - \text{bit}$$

comprises a mapping/demapping of combination of the index $$\left\{ n_3^{(0)}, \ldots, n_3^{(\lfloor \frac{M_l}{2} \rfloor-1)}, n_3^{(\lfloor \frac{M_l}{2} \rfloor+1)}-1 \ldots, n_3^{(M_l-1)}-1 \right\}.$$

In this case, the encoding of the FD bases $$n_3^{(0)}, \ldots, n_3^{(\lfloor \frac{M_l}{2} \rfloor-1)}$$

before the fixed FD basis may be based on their corresponding indices, while the encoding of the FD bases $$n_3^{(\lfloor \frac{M_l}{2} \rfloor+1)}, \ldots, n_3^{(M_l-1)}$$

after the fixed FD basis is based on subtracting their corresponding indices by 1. In some cases, assuming FD basis in the middle of the intermediate set is the fixed FD basis, i.e., $$n_3^{(\lfloor \frac{M_l}{2} \rfloor)} = \left\lfloor \frac{N_3'}{2} \right\rfloor,$$

a codepoint of $$\left\lceil \log_2 \binom{N_3'-1}{M_l-1} \right\rceil$$

indicates a combination of the offsets)

$$\left\{o_3^{(0)}-1, \ldots, o_3^{\left(\left\lfloor\frac{M_l}{2}\right\rfloor-1\right)}-1, \left(o_3^{\left(\left\lfloor\frac{M_l}{2}\right\rfloor+1\right)}\right)-1 \ldots, o_3^{(M_l-1)}-1\right\}$$

of the remaining $M_l-1$ FD basis in the intermediate FD basis set, wherein the encoding/decoding of the $$\left\lceil \log_2\binom{N_3'-1}{M_l-1}\right\rceil\text{-bit}$$

comprises a mapping/demapping of combination of the offset $$\left\{o_3^{(0)}-1, \ldots, o_3^{\left(\left\lfloor\frac{M_l}{2}\right\rfloor-1\right)}-1, \left(o_3^{\left(\left\lfloor\frac{M_l}{2}\right\rfloor+1\right)}\right)-1 \ldots, o_3^{(M_l-1)}-1\right\},$$

while the indices of the remaining $M_l-1$ FD bases are $$\mathrm{mod}\left\{n_3^{\left(\left\lfloor\frac{M_l}{2}\right\rfloor+1\right)} + o_3^{(m)}, N_3'\right\},$$

where $$m = 0, \ldots \left\lfloor\frac{M_l}{2}\right\rfloor - 1, \left\lfloor\frac{M_l}{2}\right\rfloor + 1, M_l - 1$$

In some cases, the fixed FD basis in the middle is actually the strongest FD basis indicated by the strongest coefficient indicator. In some other cases, a bitmap with size $(N_3'-1)$-bit may be used to indicate the selection of $M_l$ from $N_3'$ bases for layer l. Assuming the last FD basis is fixed as the last FD basis in the intermediate FD bases set, i.e., $n_3^{(M_l)}=N_3'-1$, it may indicates the combination of $\{n_3^{(0)}, n_3^{(1)}, \ldots, n_3^{(M_l-1)}\}$-th FD basis, by setting the $n_3^{(0)}$-th, $n_3^{(2)}$-th, ..., $n_3^{(M_l-2)}$-th bit to 1, respectively, while others to zeros. In some other cases, it may indicates the combination of offsets $\{o_3^{(0)}-1, o_3^{(1)}-1, \ldots, o_3^{(M_l-2)}-1\}$-th FD basis, by setting the $(o_3^{(0)}-1)$-th, $(o_3^{(1)}1)$-th, ..., $(o_3^{(M_l-2)}-1)$-th bit to 1, respectively, while others to zeros. In this case, the FD basis index $n_3^{(m)}=N_3'-1-o_3^{(m)}$, m=0, 1, ... $M_l-2$. In some other cases, assuming the first FD basis is fixed as the first FD basis in the entire FD bases set, i.e., $n_3^{(0)}=0$. It may indicates the combination of $\{n_3^{(1)}), n_3^{(2)}, \ldots, n_3^{(M_l-1)}\}$-th FD basis by indicating the offset to the first FD basis (wherein a zero offset means the next adjacent FD basis), by setting the $(o_3^{(1)}-1)$-th, $(o_3^{(2)}-1)$-th, ..., $(o_3^{(M_l-1)}-1)$-th bit to 1, while others to zeros. In this case, the FD basis index $n_3^{(0)}=o_3^{(m)}$, m=1, 2, ... $M_l-1$. In some cases, assuming FD basis in the middle of the intermediate set is the fixed FD basis, i.e., $$n_3^{\left(\left\lfloor\frac{M_l}{2}\right\rfloor\right)} = \left\lfloor\frac{N_3'}{2}\right\rfloor.$$

It may indicate the combination of $$\left\{n_3^{(0)}, \ldots, n_3^{\left(\left\lfloor\frac{M_l}{2}\right\rfloor-1\right)}, n_3^{\left(\left\lfloor\frac{M_l}{2}\right\rfloor+1\right)}-1 \ldots, n_3^{(M_l-1)}-1\right\}\text{-th}$$

FD basis, by setting the $$n_3^{(0)}\text{-th}, \ldots, n_3^{\left(\left\lfloor\frac{M_l}{2}\right\rfloor-1\right)}\text{-th}, \left(n_3^{\left(\left\lfloor\frac{M_l}{2}\right\rfloor+1\right)}-1\right)\text{-th} \ldots,$$

$(n_3^{(M_l-1)}-1)$-th bit to 1, respectively, while others to zeros. Alternatively, it may indicate the combination of the offset $$\left\{o_3^{(0)}-1, \ldots, o_3^{\left(\left\lfloor\frac{M_l}{2}\right\rfloor-1\right)}-1, \left(o_3^{\left(\left\lfloor\frac{M_l}{2}\right\rfloor+1\right)}\right)-1 \ldots, o_3^{(M_l-1)}-1\right\},$$

by setting the $$o_3^{(0)}\text{-th}, \ldots, o_3^{\left(\left\lfloor\frac{M_l}{2}\right\rfloor-1\right)}\text{-th}, \left(o_3^{\left(\left\lfloor\frac{M_l}{2}\right\rfloor+1\right)}\right)\text{-th} \ldots,$$

$(o_3^{(M_l-1)}-1)$-th bit to 1, respectively, while others to zeroes. The indices of the remaining $M_l-1$ FD bases are $$\mathrm{mod}\left\{n_3^{\left(\left\lfloor\frac{M_l}{2}\right\rfloor+1\right)} + o_3^{(m)}, N_3'\right\},$$

where $$m = 0, \ldots \left\lfloor\frac{M_l}{2}\right\rfloor - 1, \left\lfloor\frac{M_l}{2}\right\rfloor +$$

1, $M_l-1$.

Figure 8:
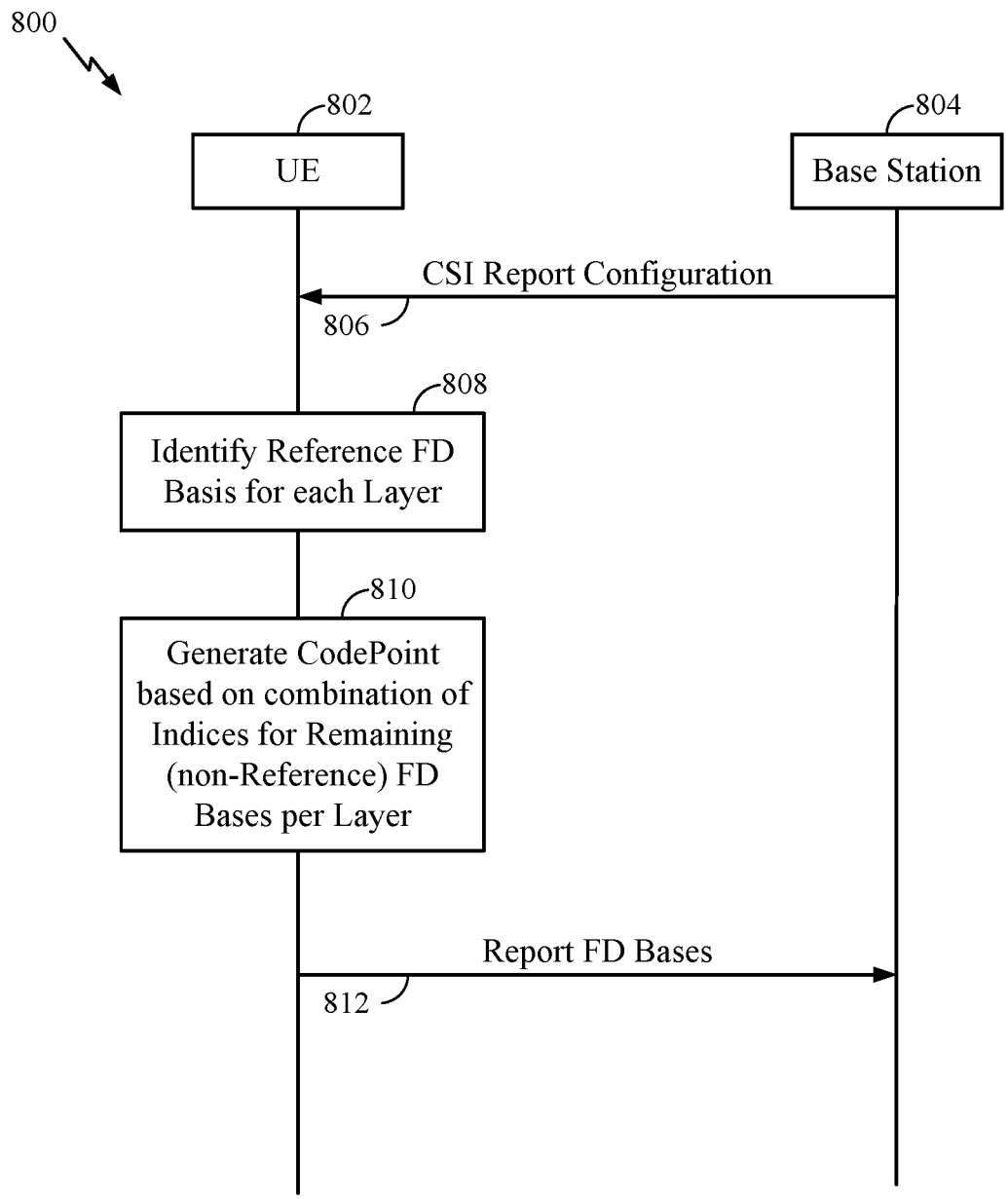
FIG. 8 is a call flow diagram illustrating example operations for wireless communication between a UE and BS, in accordance with certain aspects of the present disclosure.

FIG. 8 is a call flow diagram 800 illustrating an example scenario for CSI reporting between a UE 802 and a base station 804, in accordance with certain aspects of the present disclosure.

Initially, the UE 802 is configured to receive a CSI report configuration message 806 from the BS 804. The CSI report configuration message may be communicated via any of a downlink control information (DCI) message or a radio resource control (RRC) message. The CSI report configuration message 806 may include one or more parameters configured by the base station, the wireless network (e.g., core network), or according to a specification relating to the wireless network (e.g., 3GPP). The one or more parameters may include a p ratio, an a value, an R value, and/or a configured $N_3$ value.

As noted above, in some configurations, the UE 802 is configured to signal FD bases per layer, based on a common reference FD basis per layer. As illustrated, the UE 802 may identify the reference FD basis for each layer at 808. In some cases, at 810, the UE 802 may encode the combination of indices or offsets for the remaining (non-reference) FD bases as a codepoint in a codebook. The UE may then transmits 812 a UCI message containing an indication of the one or more FD bases per layer, for example, encoded as a codepoint generated at 810.

In some cases, the codepoint may be generated based on entries of combinatorial coefficients in a table (e.g., such as the table 5.2.2.2.3-1 in TS38.214 standard specification, which has 16×4 entries for x=0 to 15 and y=1 to 4, or an extended version of such a table with additional entries). In such a table, each row index may correspond to an FD index/offset the UE wants to encode, and the number of columns may be equal to the number of FD index/offset the UE wants to encode (e.g., $M_l-1$). The UE may use the table as follows:

1. Order the FD bases index/offset in ascending order, e.g., $m_3^{(0)} < \ldots < m_3^{(M_l-2)}$ (or $o_3^{(0)} < \ldots < o_3^{(M_l-2)}$ or $n_3^{(0)} < \ldots < n_3^{(M_l-2)}$) if last FD basis is fixed; $m_3^{(1)} < \ldots < m_3^{(M_l-1)}$ (or $o_3^{(1)} < \ldots < o_3^{(M_l-1)}$ or $n_3^{(1)} < \ldots < n_3^{(M_l-1)}$) if first FD basis is fixed;
2. For the m-th basis after the ordering, we look for the value from row $m_3^{(m)}$ (or $o_3^{(m)}-1$ or $n_3^{(m)}$ or $m_3^{(m)}-1$ or $n_3^{(m)}-1$) and column m.
3. Summing all the $M_l-1$ found values and the sum is actually the codepoint of the combinatorial indicator.

At BS side, after recovering the codepoint, the BS may effectively decode the codepoint as follows (e.g., the summation of the found values, and denote it by T):

1. Find the smallest value <=T in the last column, i.e., $(M_l-1)$-th column, then the row index of the found value is related to the corresponding FD bases offset/index $m_3^{(m)}$ (or $o_3^{(m)}$ or $n_3^{(m)}$).
2. Update T by subtracting the found value from T, then do the same in step 1 in column $(M_l-2)$. These steps may be repeated until the first column and first index/offset is recovered.

Figure 9:
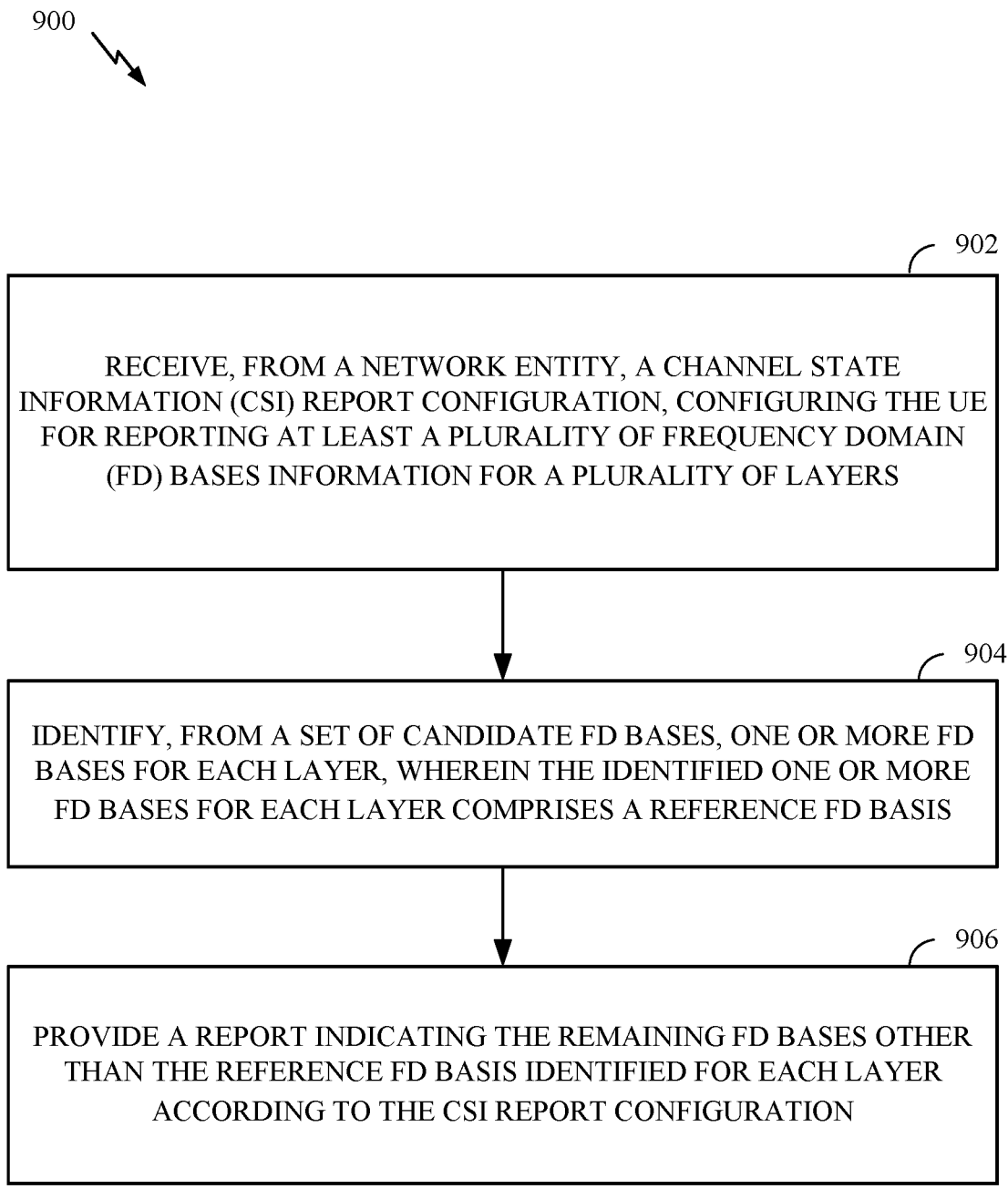
FIG. 9 is a flow diagram illustrating example operations for wireless communication by a UE, in accordance with certain aspects of the present disclosure.

FIG. 9 is a flow diagram illustrating example operations 900 for wireless communication by a UE, in accordance with certain aspects of the present disclosure. The example operations 900 may be performed by a UE. For example, the operations 900 may be performed by a UE 120 (e.g., the UE 120a) in the wireless communication network 100. Operations 900 may be implemented as software components that are executed and run on one or more processors. Further, the transmission and reception of signals by the UE in operations 900 may be enabled, for example, by one or more antennas. In certain aspects, the transmission and/or reception of signals by the UE may be implemented via a bus interface of one or more processors obtaining and/or outputting signals.

Operations 900 begin, at 902, by receiving, from a network entity, a channel state information (CSI) report configuration, configuring the UE for reporting at least a plurality of frequency domain (FD) bases information for a plurality of layers. At 904, the UE identifies, from a set of candidate FD bases, one or more FD bases for each layer, wherein the identified one or more FD bases for each layer comprises a reference FD basis. At 906, the UE provides a report indicating the remaining FD bases other than the reference FD basis identified for each layer according to the CSI report configuration.

As noted above, in some cases, the one or more FD bases for each layer are selected from an intermediate set of FD bases that comprises a subset of available candidate FD bases and the reference FD basis is located within the intermediate set. In such cases, the report may indicates each of the remaining identified FD basis selected from the intermediate set as an index in the intermediate set or an offset relative to an index of the reference FD basis within the intermediate set. As an example, assuming an intermediate set (IntS) of $\{14, 15, 0, 1, 2, 3, 4, 5\}$, the zero value index 0 in this intermediate set may be considered the reference index. In some cases, this reference index may not reported, for example, if only non-zero indices are reported.

As noted above, in some cases, each FD basis selected for each layer is indicated by an offset index relative to a local index of the reference FD basis within the intermediate set. Again referring to the example intermediate set is $\{14, 15, 0, 1, 2, 3, 4, 5\}$, the offset relative to 0 (which is in the third position) is $\{-2, -1, 0, 1, 2, 3, 4, 5\}$. In some cases, UE may report 4 bases from the intermediate set for each layer. In some cases, a combination of 4 bases are encoded via Table 5.2.2.2.5-4 of TS38.214, which requires non-zero input. To this end taking the modulo with the respective to 8 yields $\{6, 7, 0, 1, 2, 3, 4, 5\}$ from which UE may report 4 bases for each layer. More generally, the UE may report an initial index of the FD bases (denoted by $M_{initial}$) in the intermediate set, then the intermediate set is given by IntS=$\{(M_{initial}+i) \bmod N_3, i=0, 1, \ldots, 2M_v-1\}$, wherein $2M_v$ is the size of the intermediate set and M initial≤0. Since zero value index 0 in the intermediate set is considered as the reference index, its local index in the intermediate set is $-M_{initial}$ (as $M_{initial}+(M_{initial})=0$), and the offset indices relative to 0 are $M_{initial}+i$, i=0, 1, \ldots, $2M_v-1$. In some cases, UE may report $M_v$ bases from the intermediate set for each layer. In some cases, a combination of $M_v$ bases are encoded via Table 5.2.2.2.5-4 of TS38.214, which requires non-zero input. To this end, taking the modulo to $M_{initial}+i$, i=0, 1, \ldots, $2M_v-1$ with the respect to $2M_v$ yields $$\begin{cases} M_{initial}+i, & 0 \le M_{initial}+i \le M_{initial}+2M_v-1 \\ 2M_v+(M_{initial}+i), & M_{initial} \le M_{initial}+i < 0 \end{cases}$$

from which UE may report $M_v$ for each layer. In some cases, denoting $n_3^{(f)}$ as the FD basis index of the i-th basis in the intermediate set, the offset indices relative to)) the FD basis 0 can be expressed by $n_{3,l}^{(f)}-N_3$ as $n_{3,l}^{(f)}-N_3=M_{initial}+i$ when $M_{initial}+i<0$, expressed by $n_{3,l}^{(f)}$ as $n_{3,l}^{(f)}=M_{initial}+i$ when $M_{initial}+i \ge 0$. Then, the above equation can be written as $$\begin{cases} n_{3,l}^{(f)} & 0 \le n_{3,l}^{(f)} \le M_{initial}+2M_v-1 \\ 2M_v+(n_{3,l}^{(f)}-N_3), & M_{initial}+N_3 \le n_{3,l}^{(f)} < N_3 \end{cases}$$

Figure 10:
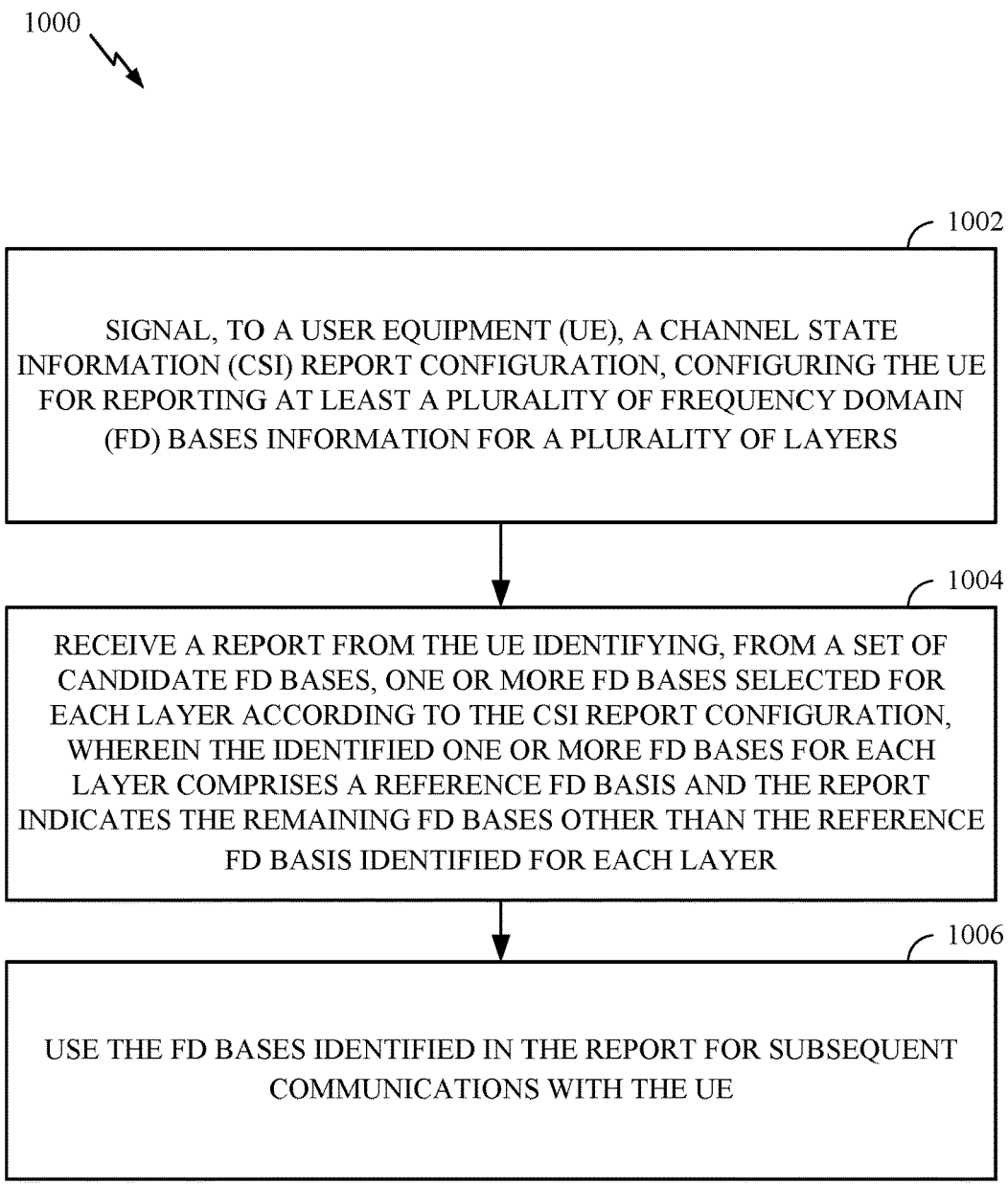
FIG. 10 is a flow diagram illustrating example operations for wireless communication by a base station, in accordance with certain aspects of the present disclosure.

FIG. 10 is a flow diagram illustrating example operations 1000 for wireless communication by a network entity (e.g., a base station, such as an eNB or gNB), in accordance with certain aspects of the present disclosure. The example operations 1000 may be performed by a base station. For example, the operations 1000 may be performed by a BS 110 in the wireless communication network 100. Operations 1000 may be implemented as software components that are executed and run on one or more processors. Further, the transmission and reception of signals by the base station in operation 1000 may be enabled, for example, by one or more antennas. In certain aspects, the transmission and/or reception of signals by the base station may be implemented via a bus interface of one or more processors obtaining and/or outputting signals.

Operations 1000 begin, at 1002, by signaling, to a user equipment (UE), a channel state information (CSI) report configuration, configuring the UE for reporting at least a plurality of frequency domain (FD) bases information for a plurality of layers. At 1004, the network entity receives a report from the UE identifying, from a set of candidate FD bases, one or more FD bases selected for each layer according to the CSI report configuration, wherein the identified one or more FD bases for each layer comprises a reference FD basis and the report indicates the remaining FD bases other than the reference FD basis identified for each layer. At 1006, the network entity uses the FD bases identified in the report for subsequent communications with the UE.

EXAMPLE EMBODIMENTS

Embodiment 1

A method for communication by a user equipment (UE), comprising receiving, from a network entity, a channel state information (CSI) report configuration, configuring the UE for reporting at least a plurality of frequency domain (FD) bases information for a plurality of layers, identifying, from a set of candidate FD bases, one or more FD bases for each layer, wherein the identified one or more FD bases for each layer comprises a reference FD basis, and providing a report indicating the remaining FD bases other than the reference FD basis identified for each layer according to the CSI report configuration.

Embodiment 2

The method of Embodiment 1, wherein the report indicates each of the remaining identified FD basis comprises a report indicating an offset relative to an index of the reference FD basis.

Embodiment 3

The method of any of Embodiments 1-2, wherein the report indicating each of the rest identified FD basis comprises a report indicating the index of each of the rest identified FD basis.

Embodiment 4

The method of any of Embodiments 1-3, wherein identifying one or more FD bases for each layer further comprises identifying a subset of one or more FD bases and the subset is common for all layers.

Embodiment 5

The method of any of Embodiments 1-4, further comprising mapping, for each level, the combination of offsets or indices for each selected FD to a codepoint and providing the codepoint for each level in the report.

Embodiment 6

The method of Embodiment 5, wherein the codepoint is generated by obtaining values from a table with entries having row indices that correspond to offsets or indices to encode in the codepoint and column indices that correspond to orders of the offsets or indices when ranked in ascending order and summing the obtained values to generate the codepoint.

Embodiment 7

The method of any of Embodiments 1-6, wherein the reference FD basis comprises a first FD basis in a set of available FD bases, a last FD basis in a set of available FD bases, or a FD basis in the middle of the available FD bases.

Embodiment 8

The method of any of Embodiments 1-7, wherein the reference FD basis corresponds to a strongest FD basis.

Embodiment 9

The method of any of Embodiments 1-8, wherein the one or more FD bases for each layer are selected from an intermediate set of FD bases that comprises a subset of available candidate FD bases and the reference FD basis is located within the intermediate set.

Embodiment 10

The method of Embodiment 9, wherein the report indicates each of the remaining identified FD basis selected from the intermediate set as an index in the intermediate set or an offset relative to an index of the reference FD basis within the intermediate set.

Embodiment 11

The method of any of Embodiments 9-10, wherein the intermediate set of FD bases comprises a subset of one or more FD bases and the subset is common for all layers.

Embodiment 12

The method of any of Embodiments 9-11, wherein each FD basis selected for each layer is indicated by an offset index relative to a local index of the reference FD basis within the intermediate set.

Embodiment 13

The method of any of Embodiments 9-12, wherein the reference FD basis comprises a first FD basis in the intermediate set of FD bases, a last FD basis in the intermediate set of FD bases, or a FD basis in the middle of the intermediate set of FD bases.

Embodiment 14

The method of any of Embodiments 9-13, wherein the reference FD basis corresponds to a strongest FD basis in the intermediate set of FD bases.

Embodiment 15

The method of any of Embodiments 1-14, wherein the reference FD basis is defined in a standard specification.

Embodiment 16

The method of any of Embodiments 1-15, further comprising receiving signaling configuring the reference FD basis.

Embodiment 17

A method for communication by a network entity, comprising signaling, to a user equipment (UE), a channel state information (CSI) report configuration, configuring the UE for reporting at least a plurality of frequency domain (FD)

bases information for a plurality of layers, receiving a report from the UE identifying, from a set of candidate FD bases, one or more FD bases selected for each layer according to the CSI report configuration, wherein the identified one or more FD bases for each layer comprises a reference FD basis and the report indicates the remaining FD bases other than the reference FD basis identified for each layer, and using the FD bases identified in the report for subsequent communications with the UE.

Embodiment 18

The method of Embodiment 17, wherein the report indicates each of the remaining identified FD bases as an offset relative to an index of the reference FD basis.

Embodiment 19

The method of any of Embodiments 17-18, wherein the report indicates the index of each of the remaining identified FD bases.

Embodiment 20

The method of any of Embodiments 17-19, wherein identifying one or more FD bases for each layer further comprises identifying a subset of one or more FD bases and the subset is common for all layers.

Embodiment 21

The method of any of Embodiments 17-20, wherein the report comprises, for each level, a codepoint that maps to the combination of offsets or indices for each selected FD and the network entity demaps the codepoints to identify the individual offsets or indices.

Embodiment 22

The method of Embodiment 21, wherein demapping the codepoints further comprises demapping the codepoints based on a plurality of one or more values in a table, wherein the row index of each of the one or more value corresponds to an offset or index of FD basis, and the column index of each of the one or more value corresponds to the order of the offset or index of the FD basis when the offsets or indices FD bases are ranked in ascending order.

Embodiment 23

The method of any of Embodiments 17-22, wherein the reference FD basis comprises a first FD basis in a set of available FD bases, a last FD basis in a set of available FD bases, or a FD basis in the middle of the available FD bases.

Embodiment 24

The method of any of Embodiments 17-23, wherein the reference FD basis corresponds to a strongest FD basis.

Embodiment 25

The method of any of Embodiments 17-24, wherein the one or more FD bases for each layer are selected from an intermediate set of FD bases that comprises a subset of available candidate FD bases and the reference FD basis is located within the intermediate set.

Embodiment 26

The method of Embodiment 25, wherein the report indicates each of the remaining identified FD basis selected from the intermediate set as an index in the intermediate set or an offset relative to an index of the reference FD basis within the intermediate set.

Embodiment 27

The method of any of Embodiments 25-26, wherein the intermediate set of FD bases comprises a subset of one or more FD bases and the subset is common for all layers.

Embodiment 28

The method of any of Embodiments 25-27, wherein each FD basis selected for each layer is indicated by an offset index relative to a local index of the reference FD basis within the intermediate set.

Embodiment 29

The method of any of Embodiments 25-28, wherein the reference FD basis comprises a first FD basis in the intermediate set of FD bases, a last FD basis in the intermediate set of FD bases, or a FD basis in the middle of the intermediate set of FD bases.

Embodiment 30

The method of any of Embodiments 25-30, wherein the reference FD basis corresponds to a strongest FD basis in the intermediate set of FD bases.

Embodiment 31

The method of any of Embodiments 17-30, wherein the reference FD basis is defined in a standard specification.

Embodiment 32

The method of any of Embodiments 17-31, further comprising providing signaling configuring the reference FD basis.

Embodiment 33

An apparatus for communication by a user equipment (UE), comprising means for receiving, from a network entity, a channel state information (CSI) report configuration, configuring the UE for reporting at least a plurality of frequency domain (FD) bases information for a plurality of layers, means for identifying, from a set of candidate FD bases, one or more FD bases for each layer, wherein the identified one or more FD bases for each layer comprises a reference FD basis, and means for providing a report indicating the remaining FD bases other than the reference FD basis identified for each layer according to the CSI report configuration.

Embodiment 34

An apparatus for communication by a network entity, comprising means for signaling, to a user equipment (UE), a channel state information (CSI) report configuration, configuring the UE for reporting at least a plurality of frequency domain (FD) bases information for a plurality of layers, means for receiving a report from the UE identifying, from a set of candidate FD bases, one or more FD bases selected for each layer according to the CSI report configuration, wherein the identified one or more FD bases for each layer comprises a reference FD basis and the report indicates the remaining FD bases other than the reference FD basis identified for each layer, and means for using the FD bases identified in the report for subsequent communications with the UE.

Embodiment 35

An apparatus for communication by a user equipment (UE), comprising a receiver configured to receive, from a network entity, a channel state information (CSI) report configuration, configuring the UE for reporting at least a plurality of frequency domain (FD) bases information for a plurality of layers and at least one processor configured to identify, from a set of candidate FD bases, one or more FD bases for each layer, wherein the identified one or more FD bases for each layer comprises a reference FD basis and to provide a report indicating the remaining FD bases other than the reference FD basis identified for each layer according to the CSI report configuration.

Embodiment 36

An apparatus for communication by a network entity, comprising a transmitter configured to signal, to a user equipment (UE), a channel state information (CSI) report configuration, configuring the UE for reporting at least a plurality of frequency domain (FD) bases information for a plurality of layers, a receiver configured to receive a report from the UE identifying, from a set of candidate FD bases, one or more FD bases selected for each layer according to the CSI report configuration, wherein the identified one or more FD bases for each layer comprises a reference FD basis and the report indicates the remaining FD bases other than the reference FD basis identified for each layer, and at least one processor configured to use the FD bases identified in the report for subsequent communications with the UE. The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for communication by a user equipment (UE), comprising:
   receiving, from a network entity, a channel state information (CSI) report configuration configuring the UE for reporting at least a plurality of frequency domain (FD) bases information for each of a plurality of layers associated with a common FD basis per layer;
   identifying, from a set of candidate FD bases, one or more FD bases for each layer, wherein the identified one or more FD bases for each layer comprises the common FD basis; and
   providing a report indicating remaining identified FD bases other than the common FD basis for each layer according to the CSI report configuration, wherein:
   the common FD basis corresponds to a strongest FD basis,
   the remaining identified FD bases are selected from an intermediate set of FD bases that comprises a subset of the set of candidate FD bases, and
   the strongest FD basis is located within the intermediate set.

2. The method of claim 1, wherein the report indicating each of the remaining identified FD bases comprises an offset relative to an index of the common FD basis for each layer.

3. The method of claim 2, further comprising:
mapping, for each level, a combination of offsets or indices for each FD basis to a codepoint; and
providing the codepoint for the each level in the report.

4. The method of claim 3, wherein the codepoint is generated by:
obtaining values from a table with entries having row indices that correspond to the offsets or indices to encode in the codepoint and column indices that correspond to orders of the offsets or indices when ranked in ascending order; and
summing the obtained values to generate the codepoint.

5. The method of claim 1, wherein the report indicating each of the remaining identified FD bases comprises an index of each of the remaining identified FD bases.

6. The method of claim 1, wherein the identifying comprises identifying a subset of the one or more FD bases and the subset is common for all layers.

7. The method of claim 1, wherein the common FD basis comprises:
a first FD basis in a set of available FD bases; or
a last FD basis in the set of available FD bases; or
an FD basis in a middle of the set of available FD bases.

8. The method of claim 1, wherein the report indicates each of the remaining identified FD bases selected from the intermediate set as:
an index in the intermediate set; or
an offset relative to an index of the common FD basis within the intermediate set.

9. The method of claim 1, wherein the intermediate set comprises a subset of the one or more FD bases and the subset is common for all layers.

10. The method of claim 1, wherein each FD basis selected for each layer is indicated by an offset index relative to a local index of the common FD basis within the intermediate set.

11. The method of claim 1, wherein the common FD basis comprises:
a first FD basis in the intermediate set;
a last FD basis in the intermediate set; or
an FD basis in a middle of the intermediate set.

12. The method of claim 9, wherein the common FD basis corresponds to a strongest FD basis in the intermediate set.

13. The method of claim 1, wherein the common FD basis is defined in a standard specification.

14. The method of claim 1, wherein the strongest FD basis is indicated by a strongest coefficient indicator per layer.

15. A method for communication by a network entity, comprising:
signaling, to a user equipment (UE), a channel state information (CSI) report configuration configuring the UE for reporting at least a plurality of frequency domain (FD) bases information for each of a plurality of layers associated with a common FD basis per layer;
receiving a report from the UE identifying, from a set of candidate FD bases, one or more FD bases selected for each layer according to the CSI report configuration, wherein the identified one or more FD bases for each layer comprises the common FD basis and the report indicates remaining identified FD bases other than the common FD basis for each layer; and
using the FD bases identified in the report for subsequent communications with the UE, wherein:
the common FD basis corresponds to a strongest FD basis,
the remaining identified FD bases are selected from an intermediate set of FD bases that comprises a subset of the set of candidate FD bases, and
the strongest FD basis is located within the intermediate set.

16. The method of claim 15, wherein the report indicates each of the remaining identified FD bases as an offset relative to an index of the common FD basis, or an index of each of the remaining identified FD bases.

17. The method of claim 16, wherein:
the report comprises, for each level, a codepoint that maps to a combination of offsets or indices for each selected FD;
the network entity demaps codepoints to identify individual offsets or indices; and
demapping the codepoints further comprises:
demapping the codepoints based on a plurality of one or more values in a table, wherein a row index of each of the one or more values in the table corresponds to an offset or index of FD basis, and a column index of each of the one or more values in the table corresponds to an order of the offset or index of the FD basis when the offsets or indices FD bases are ranked in ascending order.

18. The method of claim 17, wherein the identifying comprises identifying a subset of the one or more FD bases and the subset is common for all layers.

19. The method of claim 15, wherein the common FD basis comprises:
a first FD basis in a set of available FD bases;
a last FD basis in the set of available FD bases; or
an FD basis in a middle of the set of available FD bases.

20. The method of claim 15, wherein the report indicates each of the remaining identified FD basis selected from the intermediate set as:
an index in the intermediate set; or
an offset relative to an index of the common reference FD basis within the intermediate set.

21. The method of claim 15, wherein the intermediate set of FD bases comprises a subset of the one or more FD bases and the subset is common for all layers.

22. The method of claim 15, wherein each FD basis selected for each layer is indicated by an offset index relative to a local index of the common FD basis within the intermediate set.

23. The method of claim 15, wherein the common FD basis comprises:
a first FD basis in the intermediate set;
a last FD basis in the intermediate set; or
an FD basis in a middle of the intermediate set.

24. The method of claim 15, wherein the strongest FD basis is indicated by a strongest coefficient indicator per layer.

25. An apparatus for communication by a user equipment (UE), comprising:
a receiver configured to receive, from a network entity, a channel state information (CSI) report configuration configuring the UE for reporting at least a plurality of frequency domain (FD) bases information for each of a plurality of layers associated with a common FD basis per layer; and
at least one processor configured to identify, from a set of candidate FD bases, one or more FD bases for each layer, wherein the identified one or more FD bases for each layer comprises the common FD basis and to provide a report indicating remaining identified FD bases other than the common FD basis for each layer according to the CSI report configuration, wherein:

the common FD basis corresponds to a strongest FD basis, the remaining identified FD bases are selected from an intermediate set of FD bases that comprises a subset of the set of candidate FD bases, and the strongest FD basis is located within the intermediate set.

26. An apparatus for communication by a network entity, comprising:

a transmitter configured to signal, to a user equipment (UE), a channel state information (CSI) report configuration configuring the UE for reporting at least a plurality of frequency domain (FD) bases information for each of a plurality of layers associated with a common FD basis per layer;

a receiver configured to receive a report from the UE identifying, from a set of candidate FD bases, one or more FD bases selected for each layer according to the CSI report configuration, wherein the identified one or more FD bases for each layer comprises the common FD basis and the report indicates remaining identified FD bases other than the common FD basis for each layer; and at least one processor configured to use the FD bases identified in the report for subsequent communications with the UE, wherein:

the common FD basis corresponds to a strongest FD basis, the remaining identified FD bases are selected from an intermediate set of FD bases that comprises a subset of the set of candidate FD bases, and the strongest FD basis is located within the intermediate set.

\* \* \* \* \*